(12) United States Patent
DiMaria et al.

(10) Patent No.: US 11,792,323 B2
(45) Date of Patent: *Oct. 17, 2023

(54) SYSTEM AND METHOD FOR USER, DEVICE, AND TRANSACTION AUTHENTICATION UTILIZING SMART CONTRACTS

(71) Applicant: Virtual Hold Technology Solutions, LLC, Akron, OH (US)

(72) Inventors: Matthew DiMaria, Brentwood, TN (US); Shannon Lekas, Cushing, TX (US); Kurt Nelson, Thompsons Station, OH (US); Nicholas James Kennedy, Akron, OH (US); Robert Harpley, Akron, OH (US)

(73) Assignee: Virtual Hold Technology Solutions, LLC, Akron, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/153,341

(22) Filed: Jan. 11, 2023

(65) Prior Publication Data
US 2023/0137650 A1 May 4, 2023

Related U.S. Application Data

(63) Continuation-in-part of application No. 17/893,006, filed on Aug. 22, 2022, now Pat. No. 11,611,658, and
(Continued)

(51) Int. Cl.
*H04M 3/00* (2006.01)
*H04M 3/523* (2006.01)
(Continued)

(52) U.S. Cl.
CPC ........ *H04M 3/5231* (2013.01); *H04L 67/306* (2013.01); *H04M 3/5183* (2013.01)

(58) Field of Classification Search
CPC .. H04M 3/5231; H04M 3/5183; H04L 67/306
(Continued)

(56) References Cited

U.S. PATENT DOCUMENTS

| 9,020,131 B2 | 4/2015 | Desai et al. |
| 10,594,865 B2 | 3/2020 | Deole et al. |

(Continued)

*Primary Examiner* — William J Deane, Jr.

(57) ABSTRACT

A system and method for user, device, and transaction authentication and callback management, utilizing a cloud platform, a digital ledger, an authentication manager, and smart callback contracts, brokering user to user communications and session establishment using an automated workflow built upon extensible root smart contract templates which can be configured to connect various users and brands. Historical user identifier and behavior data may be stored in a blockchain and/or smart callback contract and compared against current user data to authenticate and validate a user, prior to the execution of the smart callback contract, all in a way that is transparent and autonomous to the user. The system may comprise clout platform, that may further comprise a callback manager, a brand interface server, an interaction manager, a media server, one or more blockchain digital ledgers, and various smart contracts which are used to autonomously respond to received user requests.

20 Claims, 28 Drawing Sheets

Related U.S. Application Data a continuation-in-part of application No. 17/727,901, filed on Apr. 25, 2022, now Pat. No. 11,595,524, which is a continuation of application No. 17/540,114, filed on Dec. 1, 2021, now Pat. No. 11,394,829, said application No. 17/893,006 is a continuation-in-part of application No. 17/358,331, filed on Jun. 25, 2021, now Pat. No. 11,546,472, said application No. 17/540,114 is a continuation-in-part of application No. 17/336,405, filed on Jun. 2, 2021, now Pat. No. 11,522,997, said application No. 17/358,331 is a continuation-in-part of application No. 17/336,405, filed on Jun. 2, 2021, now Pat. No. 11,522,997, said application No. 17/893,006 is a continuation-in-part of application No. 17/235,408, filed on Apr. 20, 2021, now Pat. No. 11,489,964, said application No. 17/336,405 is a continuation of application No. 17/011,248, filed on Sep. 3, 2020, now Pat. No. 11,032,424, which is a continuation-in-part of application No. 16/995,424, filed on Aug. 17, 2020, now abandoned, which is a continuation-in-part of application No. 16/896,108, filed on Jun. 8, 2020, now abandoned, said application No. 17/235,408 is a continuation of application No. 16/836,798, filed on Mar. 31, 2020, now Pat. No. 10,992,811, said application No. 16/896,108 is a continuation-in-part of application No. 16/836,798, filed on Mar. 31, 2020, now Pat. No. 10,992,811, said application No. 17/358,331 is a continuation-in-part of application No. 16/591,096, filed on Oct. 2, 2019, now Pat. No. 11,431,847, said application No. 16/836,798 is a continuation of application No. 16/542,577, filed on Aug. 16, 2019, now Pat. No. 10,609,218, said application No. 16/896,108 is a continuation-in-part of application No. 16/152,403, filed on Oct. 4, 2018, now abandoned, which is a continuation-in-part of application No. 16/058,044, filed on Aug. 8, 2018, now Pat. No. 11,012,568, said application No. 16/591,096 is a continuation of application No. 15/411,534, filed on Jan. 20, 2017, now Pat. No. 10,455,090, said application No. 16/058,044 is a continuation-in-part of application No. 14/532,001, filed on Nov. 4, 2014, now Pat. No. 10,375,245, which is a continuation-in-part of application No. 13/659,902, filed on Oct. 24, 2012, now Pat. No. 8,938,221, which is a continuation-in-part of application No. 13/479,870, filed on May 24, 2012, now Pat. No. 9,055,149, and a continuation-in-part of application No. 13/446,758, filed on Apr. 13, 2012, now Pat. No. 8,792,866, which is a continuation of application No. 12/320,517, filed on Jan. 28, 2009, now Pat. No. 8,213,911, said application No. 13/479,870 is a continuation-in-part of application No. 12/320,517, filed on Jan. 28, 2009, now Pat. No. 8,213,911.

(60) Provisional application No. 62/858,454, filed on Jun. 7, 2019, provisional application No. 62/820,190, filed on Mar. 18, 2019, provisional application No. 62/291,049, filed on Feb. 4, 2016.

(51) Int. Cl.
  *H04L 67/306* (2022.01)
  *H04M 3/51* (2006.01)

(58) Field of Classification Search
  USPC ....... 379/265.01–265.14, 266.01–266.1, 309
  See application file for complete search history.

(56) References Cited

U.S. PATENT DOCUMENTS

| | | | |
|---|---|---|---|
| 10,984,330 B1 | 4/2021 | Merritt | |
| 2019/0087446 A1* | 3/2019 | Sharma | G06F 16/27 |
| 2020/0250295 A1* | 8/2020 | Padmanabhan | G06F 21/64 |
| 2022/0050915 A1* | 2/2022 | Hsy | G06F 9/547 |

* cited by examiner

SYSTEM AND METHOD FOR USER, DEVICE, AND TRANSACTION AUTHENTICATION UTILIZING SMART CONTRACTS

CROSS-REFERENCE TO RELATED APPLICATIONS

Priority is claimed in the application data sheet to the following patents or patent applications, each of which is expressly incorporated herein by reference in its entirety:

Ser. No. 17/358,331
Ser. No. 17/727,901
Ser. No. 17/893,006
Ser. No. 17/540,114
Ser. No. 17/336,405
Ser. No. 17/011,248
Ser. No. 16/995,424
Ser. No. 16/896,108
Ser. No. 16/836,798
Ser. No. 16/542,577
Ser. No. 62/820,190
Ser. No. 62/858,454
Ser. No. 16/152,403
Ser. No. 16/058,044
Ser. No. 14/532,001
Ser. No. 13/659,902
Ser. No. 13/479,870
Ser. No. 12/320,517
Ser. No. 13/446,758

BACKGROUND OF THE INVENTION

Field of the Art

The disclosure relates to the field of contact center technology, specifically to the field of cloud-implemented automated callback systems utilizing blockchain technology.

Discussion of the State of the Art

Many businesses use groups of service representatives for communicating with clients who initiate communications with the business, such as by telephone calls. To most efficiently use the time and skills of each service representative, the service representatives may be organized into groups based on a skill set. For example, the groupings may be based on the representative's ability to handle client issues such as the opening of new accounts, billing issues and customer service issues on existing accounts.

Typically, if a client calls such a business, voice prompt menu choices enable the calling client to identify the issue for which the client requires service and the client is then queued for a service agent capable of handling the identified issue. As such, it is expected that clients who identify the purpose of their call as a "billing issue" will be queued for, and connected to, a service representative with the ability to handle billing issues. Similarly, it is expected that clients who identify the purpose of their call as a "customer service issue" will be queued for, and connected to, a service representative with the ability to handle customer service issues.

There are problems with existing communications systems, such as contact centers, including the following two problems. First, the voice prompt menus that are used to channel callers to the queue for the appropriate group of service agents are exacerbating to a client at best. It takes significant time to navigate the layered menus of voice prompts.

Second, waiting on-hold while a connection, be it a phone call, web chat, video conference, or other interaction type, is maintained in queue for connection to a service agent is also exacerbating to a client at best.

In an effort to reduce customer exacerbation caused by having to maintain a connection while on-hold in queue, secondary queue systems have been developed. A typical secondary queue system obtains a telephone number at which the calling client can be reached when a service representative is available (i.e., a call back number). The client disconnects, and then, at the proper time, a call back system establishes a connection to the client utilizing the call back number and couples the client to an available representative without waiting on-hold in queue. One exemplary system is disclosed in U.S. Pat. No. 6,563,921 to Williams et al. which is commonly assigned with the present application.

While such a system may make the experience of waiting for a connection to a service representative slightly less exasperating, it does not address the inconvenience of having to navigate an irritatingly slow and usually complicated voice prompt menu to enter the queue.

What is needed is a system and various methods for providing user, device, and transaction authentication using smart contracts via a callback cloud.

SUMMARY OF THE INVENTION

Accordingly, the inventor has conceived and reduced to practice, in a preferred embodiment, a system and method for user, device, and transaction authentication and callback management, utilizing a cloud platform, a digital ledger, an authentication manager, and smart callback contracts, brokering user to user communications and session establishment using an automated workflow built upon extensible root smart contract templates which can be configured to connect various users and brands. Historical user identifier and behavior data may be stored in a blockchain and/or smart callback contract and compared against current user data to authenticate and validate a user, prior to the execution of the smart callback contract, all in a way that is transparent and autonomous to the user. The system may comprise clout platform, that may further comprise a callback manager, a brand interface server, an interaction manager, a media server, one or more blockchain digital ledgers, and various smart contracts which are used to autonomously respond to received user requests.

The following non-limiting summary of the invention is provided for clarity, and should be construed consistently with embodiments described in the detailed description below.

According to a first preferred embodiment, a system for user, device, and transaction authentication utilizing smart contracts is disclosed, comprising: an authentication manager comprising at least a processor, a memory, and a first plurality of programming instructions stored in the memory and operating on the processor, wherein the first plurality of programming instructions, when operating on the processor, cause the processor to: receive a smart callback contract, the smart callback contract comprising default data fields, wherein the default data fields are populated with information from at least historical user identifier and behavior data and a scheduled callback time; and prior to the scheduled callback time: obtain current user identifiers and behavior data from a user communication device; provide user and device authentication by comparing the current identifiers and behavior against the historical user identifier and behavior data stored within the smart callback contract to identify one or more matches between the two sets of information; and authorize the authenticated user or device to access the smart callback contract.

According to a second preferred embodiment, a method for user, device, and transaction authentication utilizing smart contracts is disclosed, comprising the steps of: receiving a smart callback contract, the smart callback contract comprising default data fields, wherein the default data fields are populated with information from at least historical user identifier and behavior data and a scheduled callback time; and prior to the scheduled callback time: obtaining current user identifiers and behavior data from a user communication device; providing user and device authentication by comparing the current identifiers and behavior against the historical user identifier and behavior data stored within the smart callback contract to identify one or more matches between the two sets of information; and authorizing the authenticated user or device to access the smart callback contract.

According to an aspect of an embodiment, the smart callback contract is stored on a blockchain ledger.

According to an aspect of an embodiment, the default data fields are further populated with information from at least user profiles, agent and brand data, environmental context and user intent, and estimated wait times.

According to an aspect of an embodiment, a callback manager comprising at least a processor, a memory, and a second plurality of programming instructions stored in the memory and operating on the processor, wherein the second programming instructions, when operating on the processor, cause the processor to: store and maintain global user profiles; store and maintain a blockchain ledger; communicate with a brand interface server; maintain relevant agent and brand data from a brand interface server; execute callback requests; determine environmental context and user intent; calculate estimated wait times for callbacks; receive a callback request and a scheduled callback time from the brand interface server; create the smart callback contract, the smart callback contract comprising default data fields, wherein the default data fields are populated with information from at least historical user identifier and behavior data and a scheduled callback time; and send the smart contract to the authentication module.

According to an aspect of an embodiment, the callback manager is further configured to: receive user authorization to access the smart contract from the authentication module; and upon receiving user authorization: execute the smart callback contract between consumers and agents at a specified time; connect the two parties, when the two first and second called parties are online; and validate the smart callback contract and add the callback to the blockchain ledger.

According to an aspect of an embodiment, a brand interface server comprising at least a processor, a memory, and a third plurality of programming instructions stored in the memory and operating on the processor, wherein the third programming instructions, when operating on the processor, cause the processor to: communicate with the callback manager; send data related to the smart callback contract and agents to the callback manager; receive user calls to a brand; create a callback request upon the user requesting a call back from a brand; schedule a callback time with user based on user availability and agent scheduling; and forward the callback request and the scheduled callback time to the callback manager.

According to an aspect of an embodiment, the user identifier and behavior data comprises at least one or more of a preferred user hand of the user, a number of fingers used by the user in typing, an average key pressure, a location, a language setting, a WiFi access point, an install date of an authentication application, an install date of one or more applications, an application usage parameter, a cadence between keystrokes, an amount of spelling errors, types of emoji used, an average number of emojis used, a swipe text usage, local region settings, a sim card identifier, a user location pattern, web site interaction time, a device angle, a device height from the ground, a user communication device identification number, a connection to a smart wearable, a time period of movement of the user communication device, and user biometric data.

According to an aspect of an embodiment, the historical user identifier and behavior data is stored on a blockchain.

According to an aspect of an embodiment, the historical user identifier and behavior data is stored as a hash value on the blockchain.

According to an aspect of an embodiment, the user communication device comprises at least a processor, a memory, a plurality of sensors, and a software application comprising a plurality of programming instructions stored in the memory and operating on the processor of the user communication device, which causes the user communication device to: monitor and collect device usage characteristic data to determine the current user identifiers and behavior data based on software application usage data and sensor data; and send the current user identifiers and behavior data to the authentication manager.

BRIEF DESCRIPTION OF THE DRAWING FIGURES

The accompanying drawings illustrate several aspects and, together with the description, serve to explain the principles of the invention according to the aspects. It will be appreciated by one skilled in the art that the particular arrangements illustrated in the drawings are merely exemplary, and are not to be considered as limiting of the scope of the invention or the claims herein in any way.

DETAILED DESCRIPTION

Figure 1:
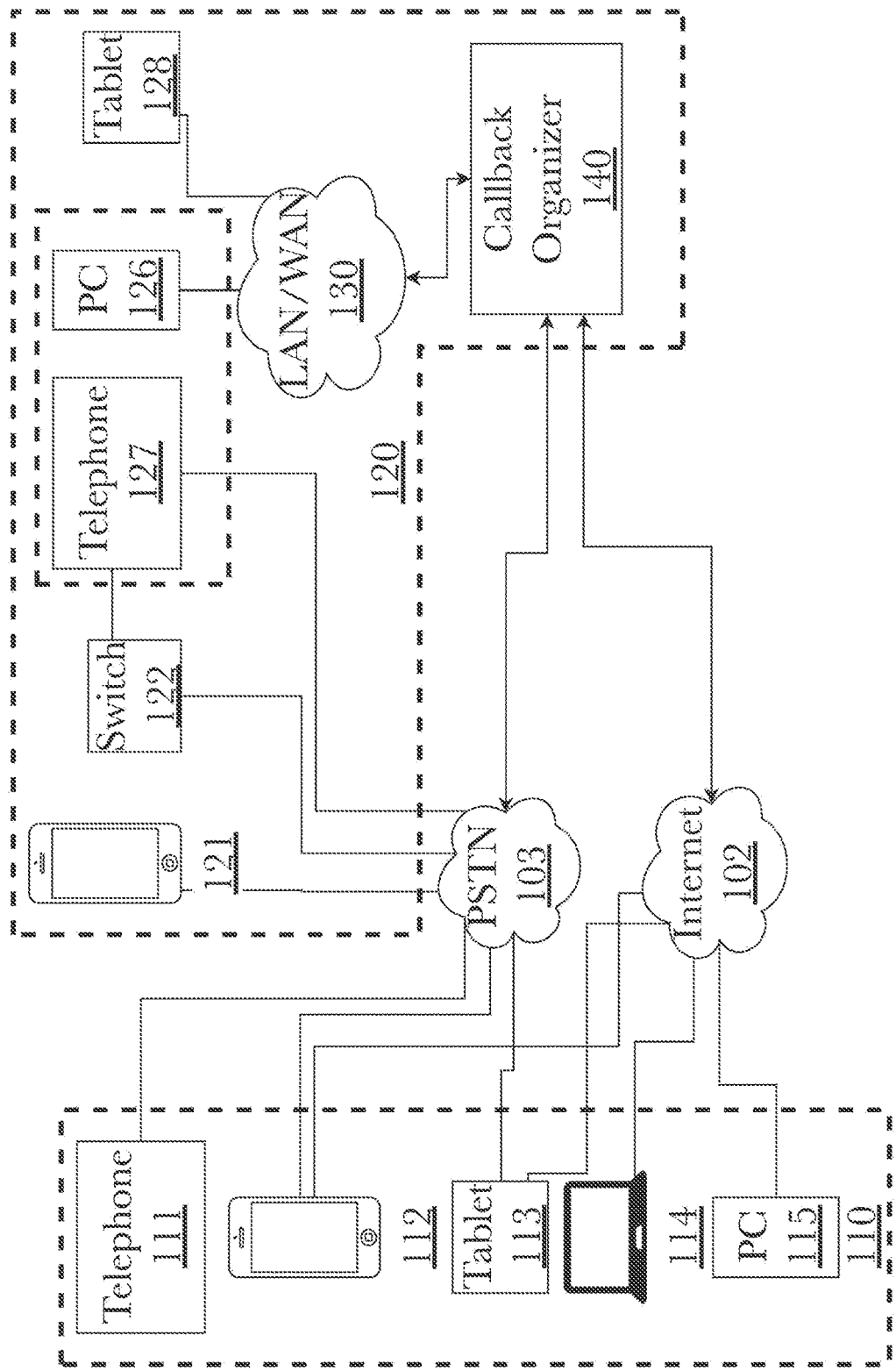
FIG. 1 (PRIOR ART) is a block diagram illustrating an on-premise callback system.

The inventor has conceived, and reduced to practice, a system and method for user, device, and transaction authentication and callback management, utilizing a cloud platform, a digital ledger, an authentication manager, and smart callback contracts, brokering user to user communications and session establishment using an automated workflow built upon extensible root smart contract templates which can be configured to connect various users and brands. Historical user identifier and behavior data may be stored in a blockchain and/or smart callback contract and compared against current user data to authenticate and validate a user, prior to the execution of the smart callback contract, all in a way that is transparent and autonomous to the user. The system may comprise clout platform, that may further comprise a callback manager, a brand interface server, an interaction manager, a media server, one or more blockchain digital ledgers, and various smart contracts which are used to autonomously respond to received user requests.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Definitions

"Callback" as used herein refers to an instance of an individual being contacted after their initial contact was unsuccessful. For instance, if a first user calls a second user on a telephone, but the second user does not receive their call for one of numerous reasons including turning off their phone or simply not picking up, the second user may then place a callback to the first user once they realize they missed their call. This callback concept applies equally to many forms of interaction that need not be restricted to telephone calls, for example including (but not limited to) voice calls over a telephone line, video calls over a network connection, or live text-based chat such as web chat or short message service (SMS) texting. While a callback (and various associated components, methods, and operations taught herein) may also be used with an email communication despite the inherently asynchronous nature of email (participants may read and reply to emails at any time, and need not be interacting at the same time or while other participants are online or available), the preferred usage as taught herein refers to synchronous communication (that is, communication where participants are interacting at the same time, as with a phone call or chat conversation).

"Callback object" as used herein means a data object representing callback data, such as the identities and call information for a first and second user, the parameters for a callback including what time it shall be performed, and any other relevant data for a callback to be completed based on the data held by the callback object.

"Latency period" as used herein refers to the period of time between when a Callback Object is created and the desired Callback is initiated, for example, if a callback object is created and scheduled for a time five hours from the creation of the object, and the callback initiates on-time in five hours, the latency period is equal to the five hours between the callback object creation and the callback initiation.

"Brand" as used herein means a possible third-party service or device that may hold a specific identity, such as a specific MAC address, IP address, a username or secret key which can be sent to a cloud callback system for identification, or other manner of identifiable device or service that may connect with the system. Connected systems or services may include a Private Branch Exchange ("PBX"), call router, chat server which may include text or voice chat data, a Customer Relationship Management ("CRM") server, an Automatic Call Distributor ("ACD"), or a Session Initiation Protocol ("SIP") server.

"Blockchain" as used herein refers to a growing list of records, called blocks, which are linked using cryptography. The blockchain is commonly a decentralized, distributed and public (or private) digital ledger that is used to record transactions across many computers so that the record cannot be altered retroactively without the alteration of all subsequent blocks and the consensus of the network. Each block contains a cryptographic hash of the previous block, a timestamp, and transaction data (generally represented as a Merkle tree root hash). For use as a distributed ledger, a blockchain is typically managed by a peer-to-peer network collectively adhering to a protocol for inter-node communication and validating new blocks. Once recorded, the data in any given block cannot be altered retroactively without alteration of all subsequent blocks, which requires consensus of the network majority. In verifying or validating a block in the blockchain, a hashcash (or other algorithm) algorithm generally requires the following parameters: a service string, a nonce, and a counter. The service string can be encoded in the block header data structure, and include a version field, the hash of the previous block, the root hash of the Merkle tree of all transactions (or information or data) in the block, the current time, and the difficulty level. The nonce can be stored in an extraNonce field, which is stored as the left most leaf node in the Merkle tree. The counter parameter is often small at 32-bits so each time it wraps the extraNonce field must be incremented (or otherwise changed) to avoid repeating work. When validating or verifying a block, the hashcash algorithm repeatedly hashes the block header while incrementing the counter & extrallonce fields. Incrementing the extrallonce field entails recomputing the Merkle tree, as the transaction or other information is the left most leaf node. The body of the block contains the transactions or other information. These are hashed only indirectly through the Merkle root.

"Smart contracts" as used herein are simply programs stored on a blockchain that run when predetermined conditions are met. They typically are used to automate the execution of an agreement so that all participants can be immediately certain of the outcome, without any intermediary's involvement or time loss. They can also automate a workflow, triggering the next action when conditions are met.

Conceptual Architecture

FIG. 1 (PRIOR ART) is a block diagram illustrating an on-premise callback system. A possible plurality of consumer endpoints 110 may be connected to either a Public Switch Telephone Network ("PSTN") 103 or the Internet 102, further connecting them to an on-premise callback system 120. Such consumer endpoints may include a telephone 111 which connects over a PSTN, a mobile phone 112 capable of connecting over either a PSTN 103 or the Internet 102, a tablet capable of connecting over either a PSTN 103 or the Internet 102, or a laptop 114 or Personal Computer ("PC") 115 capable of connecting over the Internet 102. Connected to the Internet 102 is a callback organizer 140, which organizes callback data across internet 102 and PSTN 103 connections to consumer endpoints 110 and a local area network or wide area network 130 to further on-premise components. Other on-premise or inter-organizational endpoints may include agent cellular devices 121, an internal telephone switch 122 and telephone 127 which connect to the PSTN 103, a PC 126 or a tablet 128 that may be connected over a LAN or WAN 130. These brand endpoints in an on-premise callback system 120 may be involved in callbacks over the PSTN 103 or internet 102 connections, as organized by a callback organizer 140, which is responsible for all aspects of organizing callback requests including managing and calculating Estimated Wait-Times (EWT), managing agent schedule data, managing consumer queues and the agents logged into those queues, and other typical functions of an on-premise callback system.

Figure 2:
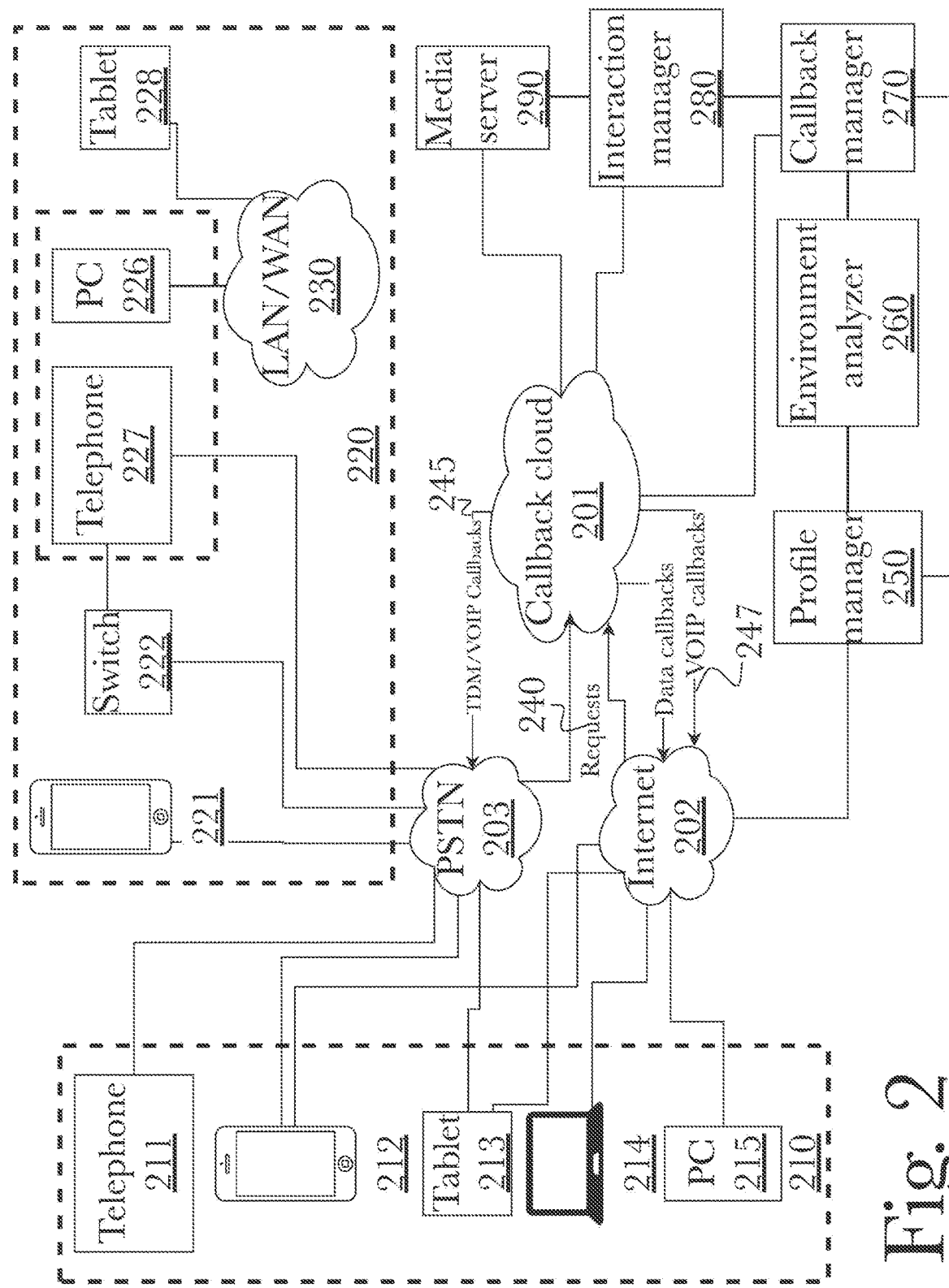
FIG. 2 is a block diagram illustrating an exemplary system architecture for operating a callback cloud, according to one aspect.

FIG. 2 is a block diagram of a preferred embodiment of the invention, illustrating an exemplary architecture of a system 200 for providing a callback cloud service. According to the embodiment, callback cloud 201 may receive requests 240 via a plurality of communications networks such as a public switched telephone network (PSTN) 203 or the Internet 202. These requests may comprise a variety of communication and interaction types, for example including (but not limited to) voice calls over a telephone line, video calls over a network connection, or live text-based chat such as web chat or short message service (SMS) texting via PSTN 203. Such communications networks may be connected to a plurality of consumer endpoints 210 and enterprise endpoints 220 as illustrated, according to the particular architecture of communication network involved. Exemplary consumer endpoints 210 may include, but are not limited to, traditional telephones 211, cellular telephones 212, mobile tablet computing devices 213, laptop computers 214, or desktop personal computers (PC) 215. Such devices may be connected to respective communications networks via a variety of means, which may include telephone dialers, VOIP telecommunications services, web browser applications, SMS text messaging services, or other telephony or data communications services. It will be appreciated by one having ordinary skill in the art that such means of communication are exemplary, and many alternative means are possible and becoming possible in the art, any of which may be utilized as an element of system 200 according to the invention.

A PSTN 203 or the Internet 202 (and it should be noted that not all alternate connections are shown for the sake of simplicity, for example a desktop PC 226 may communicate via the Internet 202) may be further connected to a plurality of enterprise endpoints 220, which may comprise cellular telephones 221, telephony switch 222, desktop environment 225, internal Local Area Network (LAN) or Wide-Area Network (WAN) 230, and mobile devices such as tablet computing device 228. As illustrated, desktop environment 225 may include both a telephone 227 and a desktop computer 226, which may be used as a network bridge to connect a telephony switch 222 to an internal LAN or WAN 230, such that additional mobile devices such as tablet PC 228 may utilize switch 222 to communicate with PSTN 202. Telephone 227 may be connected to switch 222 or it may be connected directly to PSTN 202. It will be appreciated that the illustrated arrangement is exemplary, and a variety of arrangements that may comprise additional devices known in the art are possible, according to the invention.

Callback cloud 201 may respond to requests 240 received from communications networks with callbacks appropriate to the technology utilized by such networks, such as data or Voice over Internet Protocol (VOIP) callbacks 245, 247 sent to Internet 202, or time-division multiplexing (TDM) such as is commonly used in cellular telephony networks such as the Global System for Mobile Communications (GSM) cellular network commonly used worldwide, or VOIP callbacks to PSTN 203. Data callbacks 247 may be performed over a variety of Internet-enabled communications technologies, such as via e-mail messages, application pop-ups, or Internet Relay Chat (IRC) conversations, and it will be appreciated by one having ordinary skill in the art that a wide variety of such communications technologies are available and may be utilized according to the invention. VOIP callbacks may be made using either, or both, traditional telephony networks such as PSTN 203 or over VOIP networks such as Internet 202, due to the flexibility to the technology involved and the design of such networks. It will be appreciated that such callback methods are exemplary, and that callbacks may be tailored to available communications technologies according to the invention.

Furthermore, callback cloud 201 may integrate with or be communicatively coupled with various components and/or services including, but not limited to, profile manager 250, environment analyzer 260, callback manager 270, interaction manager 280, and media server 290. These components are described below with reference to FIGS. 3-6. These components and/or services may be used by callback cloud 201 in order to facilitate callbacks between a caller and call back recipient, according to some embodiments.

Additionally, callback cloud 201 may receive estimated wait time (EWT) information from an enterprise 220 such as a contact center. This information may be used to estimate the wait time for a caller before reaching an agent (or other destination, such as an automated billing system), and determine whether to offer a callback proactively before the customer has waited for long. EWT information may also be used to select options for a callback being offered, for example to determine availability windows where a customer's callback is most likely to be fulfilled (based on anticipated agent availability at that time), or to offer the customer a callback from another department or location that may have different availability. This enables more detailed and relevant callback offerings by incorporating live performance data from an enterprise, and improves customer satisfaction by saving additional time with preselected recommendations and proactively-offered callbacks.

Figure 3:
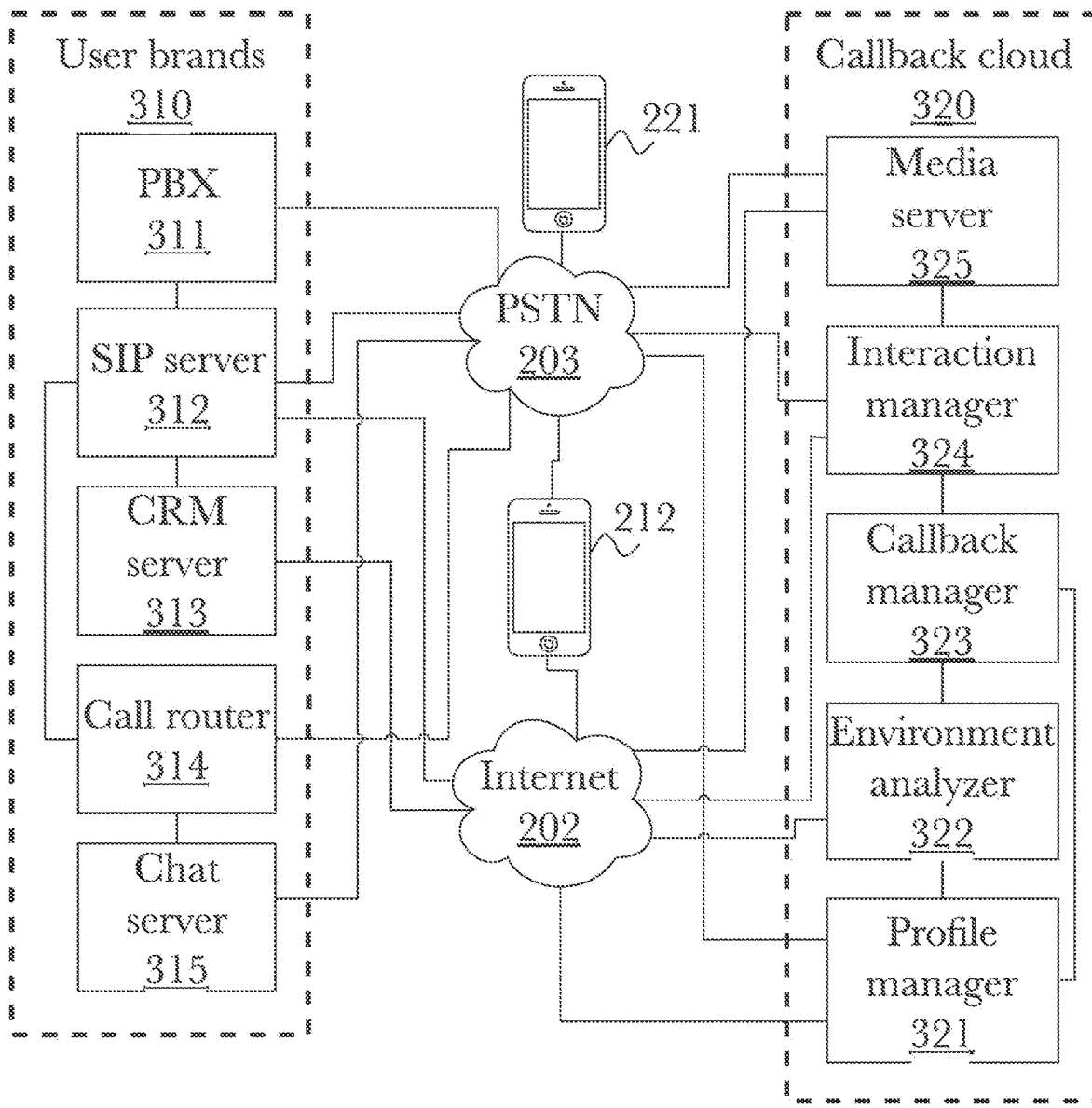
FIG. 3 is a block diagram illustrating an exemplary system architecture for a callback cloud operating over a public switched telephone network and internet, to a variety of other brand devices and services, according to an embodiment.

FIG. 3 is a block diagram illustrating an exemplary system architecture for a callback cloud operating over a public switched telephone network and the Internet, and connecting to a variety of other brand devices and services, according to an embodiment. A collection of user brands 310 may be present either singly or in some combination, possibly including a Public Branch Exchange ("PBX") 311, a Session Initiation Protocol ("SIP") server 312, a Customer Relationship Management ("CRM") server 313, a call router 314, or a chat server 315, or some combination of these brands. These brands 310 may communicate over a combination of, or only one of, a Public Switched Telephone Network ("PSTN") 203, and the Internet 202, to communicate with other devices including a callback cloud 320, a company phone 221, or a personal cellular phone 212. A SIP server 312 is responsible for initiating, maintaining, and terminating sessions of voice, video, and text or other messaging protocols, services, and applications, including handling of PBX 311 phone sessions, CRM server 313 user sessions, and calls forwarded via a call router 314, all of which may be used by a business to facilitate diverse communications requests from a user or users, reachable by phone 221, 212 over either PSTN 203 or the Internet 202. A chat server 315 may be responsible for maintaining one or both of text messaging with a user, and automated voice systems involving technologies such as an Automated Call Distributor ("ACD"), forwarding relevant data to a call router 314 and CRM server 313 for further processing, and a SIP server 312 for generating communications sessions not run over the PSTN 203. Various systems may also be used to monitor their respective interactions (for example, chat session by a chat server 315 or phone calls by an ACD or SIP server 312), to track agent and resource availability for producing EWT estimations.

When a user calls from a mobile device 212 or uses some communication application such as (for example, including but not limited to) SKYPE™ or instant messaging, which may also be available on a laptop or other network endpoint other than a cellular phone 212, they may be forwarded to brands 310 operated by a business in the manner described herein. For example, a cellular phone call my be placed over PSTN 203 before being handled by a call router 314 and generating a session with a SIP server 312, the SIP server creating a session with a callback cloud 320 with a profile manager 321 if the call cannot be completed, resulting in a callback being required. A profile manager 321 in a callback cloud 320 receives initial requests to connect to callback cloud 320, and forwards relevant user profile information to a callback manager 323, which may further request environmental context data from an environment analyzer 322. Environmental context data may include (for example, and not limited to) recorded information about when a callback requester or callback recipient may be suspected to be driving or commuting from work, for example, and may be parsed from online profiles or online textual data, using an environment analyzer 322.

A callback manager 323 centrally manages all callback data, creating a callback object which may be used to manage the data for a particular callback, and communicates with an interaction manager 324 which handles requests to make calls and bridge calls, which go out to a media server 325 which actually makes the calls as requested. In this way, the media server 325 may be altered in the manner in which it makes and bridges calls when directed, but the callback manager 323 does not need to adjust itself, due to going through an intermediary component, the interaction manager 324, as an interface between the two. A media server 325, when directed, may place calls and send messages, emails, or connect voice over IP ("VoIP") calls and video calls, to users over a PSTN 203 or the Internet 202. Callback manager 323 may work with a user's profile as managed by a profile manager 321, with environmental context from an environment analyzer 322 as well as (if provided) EWT information for any callback recipients (for example, contact center agents with the appropriate skills to address the callback requestor's needs, or online tech support agents to respond to chat requests), to determine an appropriate callback time for the two users (a callback requestor and a callback recipient), interfacing with an interaction manager 324 to physically place and bridge the calls with a media server 325. In this way, a user may communicate with another user on a PBX system 311, or with automated services hosted on a chat server 315, and if they do not successfully place their call or need to be called back by a system, a callback cloud 320 may find an optimal time to bridge a call between the callback requestor and callback recipient, as necessary.

Figure 4:
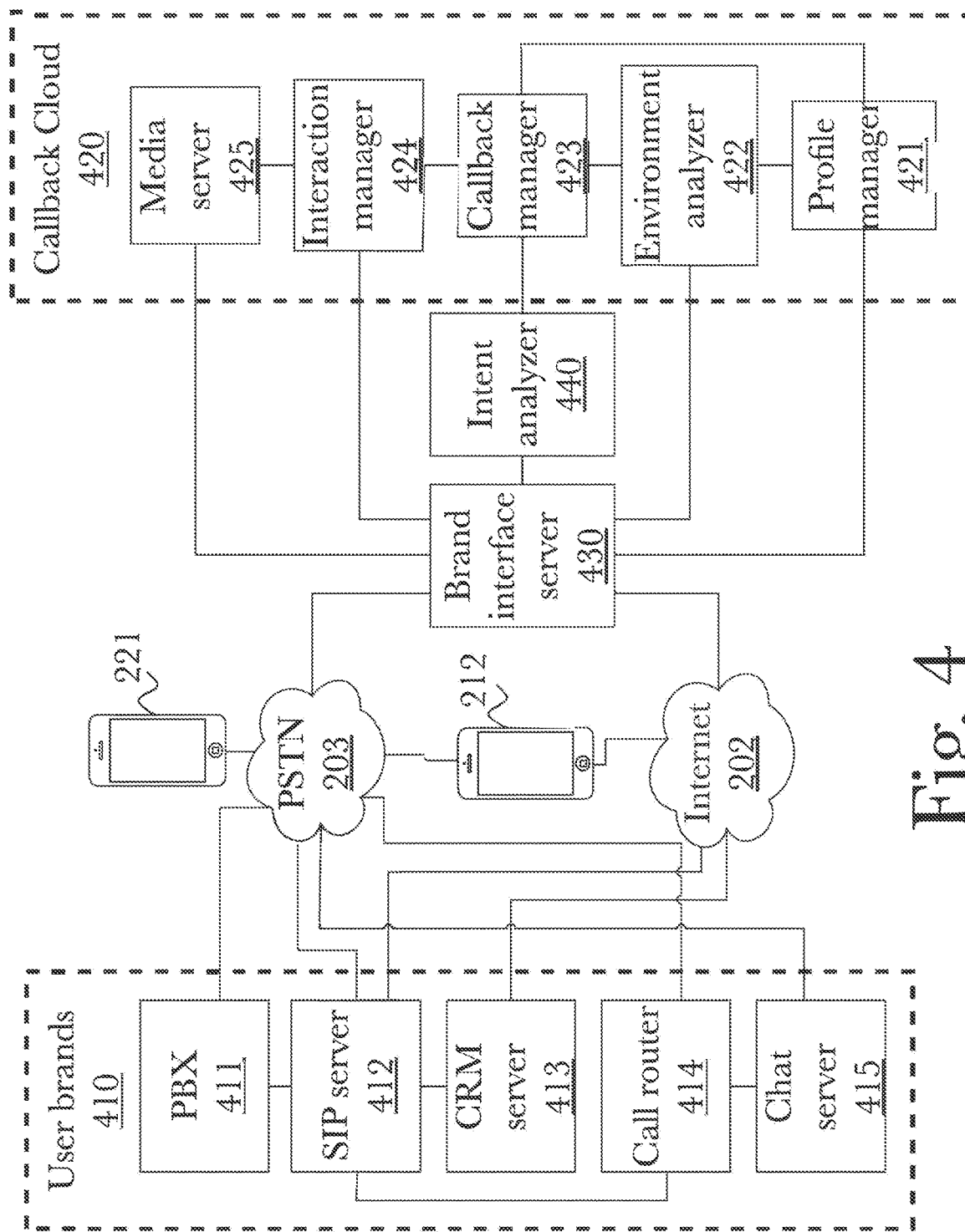
FIG. 4 is a block diagram illustrating an exemplary system architecture for a callback cloud operating including a brand interface server and intent analyzer, over a public switched telephone network and internet, to a variety of other brand devices and services, according to an embodiment.

FIG. 4 is a block diagram illustrating an exemplary system architecture for a callback cloud including a brand interface server and intent analyzer, operating over a public switched telephone network and the Internet, and connected to a variety of other brand devices and services, according to an embodiment. According to this embodiment, many user brands 410 are present, including PBX system 411, a SIP server 412, a CRM server 413, a call router 414, and a chat server 415, which may be connected variously to each other as shown, and connected to a PSTN 203 and the Internet 202, which further connect to a cellular phone 212 and a landline 221 or other phone that may not have internet access. Further shown is a callback cloud 420 contains multiple components, including a profile manager 421, environment analyzer 422, callback manager 423, interaction manager 424, and media server 425, which function as described in previous embodiments and, similarly to user brands 410 may be interconnected in various ways as depicted in the diagram, and connected to either a PSTN 203 or the internet 202.

Present in this embodiment is a brand interface server 430, which may expose the identity of, and any relevant API's or functionality for, any of a plurality of connected brands 410, to elements in a callback cloud 420. In this way, elements of a callback cloud 420 may be able to connect to, and interact more directly with, systems and applications operating in a business' infrastructure such as a SIP server 412, which may be interfaced with a profile manager 421 to determine the exact nature of a user's profiles, sessions, and interactions in the system for added precision regarding their possible availability and most importantly, their identity. Also present in this embodiment is an intent analyzer 440, which analyzes spoken words or typed messages from a user that initiated the callback request, to determine their intent for a callback. For example, their intent may be to have an hour-long meeting, which may factor into the decision by a callback cloud 420 to place a call shortly before one or both users may be required to start commuting to or from their workplace. Intent analysis may utilize any combination of text analytics, speech-to-text transcription, audio analysis, facial recognition, expression analysis, posture analysis, or other analysis techniques, and the particular technique or combination of techniques may vary according to such factors as the device type or interaction type (for example, speech-to-text may be used for a voice-only call, while face/expression/posture analysis may be appropriate for a video call), or according to preconfigured settings (that may be global, enterprise-specific, user-specific, device-specific, or any other defined scope).

Figure 5:
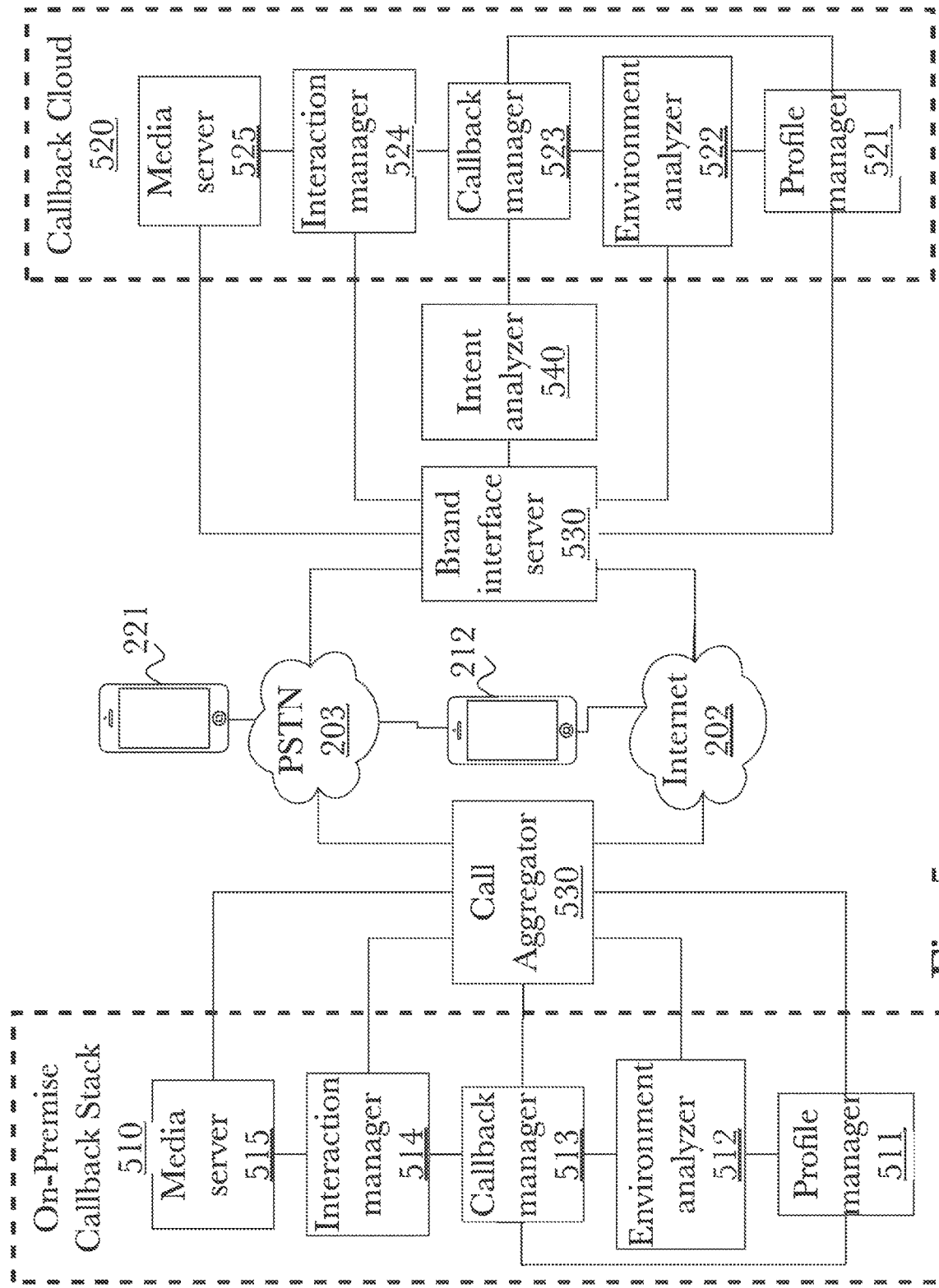
FIG. 5 is a block diagram illustrating an exemplary system architecture for a hybrid callback system operating with a callback cloud and an on-premise callback stack, according to an embodiment.

FIG. 5 is a block diagram illustrating an exemplary system architecture for a hybrid callback system operating with a callback cloud and an on-premise callback stack, according to an embodiment. According to this embodiment, an on-premise callback stack 510 is shown, which contains multiple components, including a profile manager 511, environment analyzer 512, callback manager 513, interaction manager 514, and media server 515, which are interconnected in various ways as depicted in the diagram, and connected to a call aggregator 530 which aggregates user calls into queues using data received from an on-premise callback stack 510, and allowing these aggregated and queued calls to then be managed by a callback manager 513. A call aggregator may be connected to either of a PSTN 203 or the internet 202, or it may be connected to both and receive call data from both networks as needed. Further shown is a callback cloud 520 which contains multiple similar components, including a profile manager 521, environment analyzer 522, callback manager 523, interaction manager 524, and media server 525, which function as described in previous embodiments and, similarly to an on-premise callback stack 510 may be interconnected in various ways as depicted in the diagram, and connected to either a PSTN 203 or the internet 202.

Present in this embodiment is a brand interface server 530, which may expose the identity of, and any relevant API's or functionality for, any of a plurality of connected brands or on-premise callback components 510 which may be responsible for operating related brands, to elements in a callback cloud 520. In this way, elements of a callback cloud 520 may be able to connect to, and interact more directly with, systems and applications operating in a business' infrastructure such as a SIP server, which may be interfaced with a profile manager 521 to determine the exact nature of a user's profiles, sessions, and interactions in the system for added precision regarding their possible availability and most importantly, their identity. Also present in this embodiment is an intent analyzer 540, which analyzes spoken words or typed messages from a user that initiated the callback request, to determine their intent for a callback. For example, their intent may be to have an hour-long meeting, which may factor into the decision by a callback cloud 520 to place a call shortly before one or both users may be required to start commuting to or from their workplace. Intent analysis may utilize any combination of text analytics, speech-to-text transcription, audio analysis, facial recognition, expression analysis, posture analysis, or other analysis techniques, and the particular technique or combination of techniques may vary according to such factors as the device type or interaction type (for example, speech-to-text may be used for a voice-only call, while face/expression/posture analysis may be appropriate for a video call), or according to preconfigured settings (that may be global, enterprise-specific, user-specific, device-specific, or any other defined scope).

Figure 6:
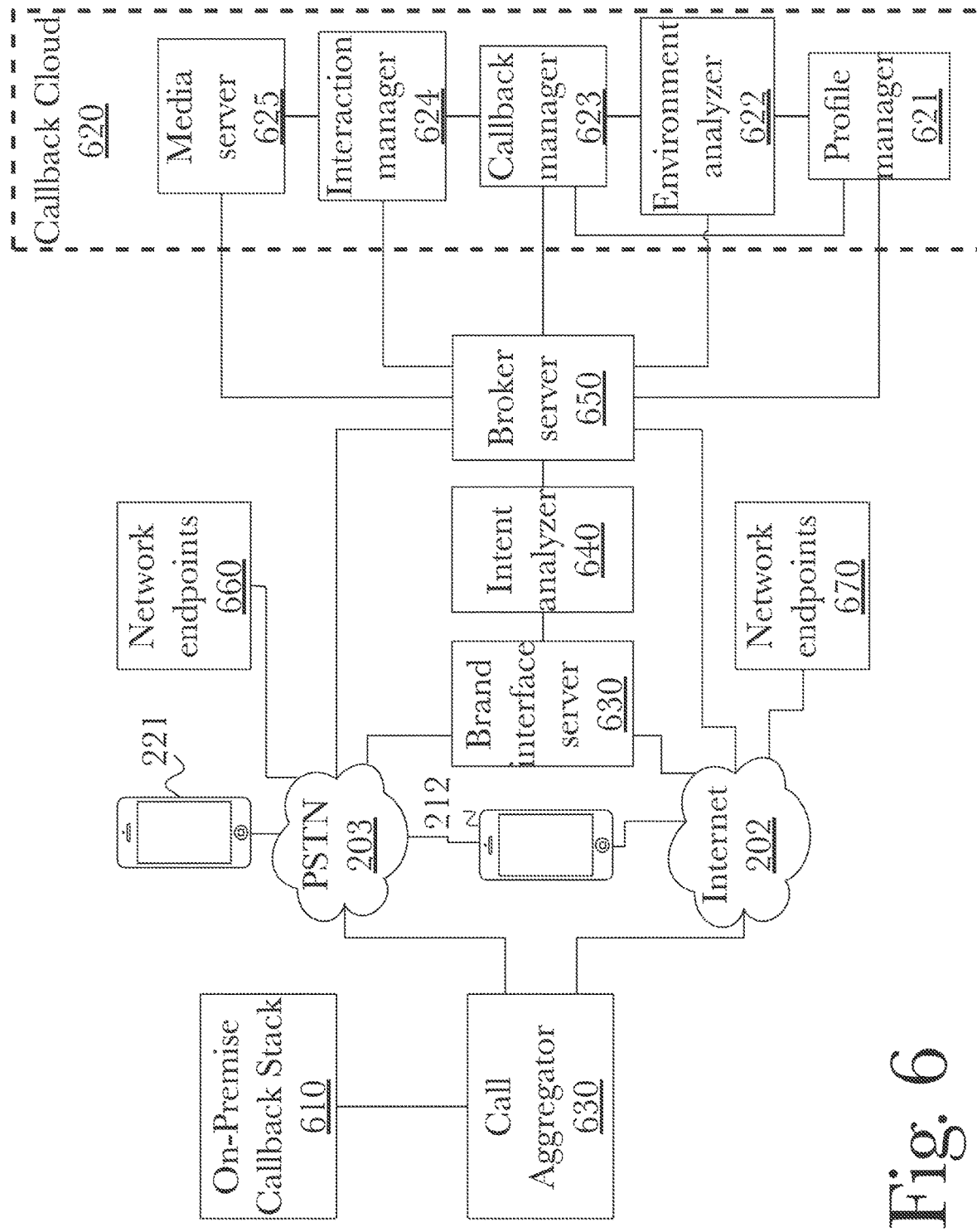
FIG. 6 is a block diagram illustrating an exemplary system architecture for a hybrid callback system operating with a callback cloud and an on-premise callback stack, and a broker server, according to an embodiment.

FIG. 6 is a block diagram illustrating an exemplary system architecture for a hybrid callback system operating with a callback cloud and an on-premise callback stack, and a broker server, according to an embodiment. According to this embodiment, an on-premise callback stack 610 is shown, which connects to a call aggregator 630 which aggregates user calls into queues using data received from an on-premise callback stack 610, and allowing these aggregated and queued calls to then be managed by a callback manager 613. The features and connections of the on-premise callback stack 610 are similar to that shown in FIG. 5, 510. A call aggregator may be connected to either of a PSTN 203 or the internet 202, or it may be connected to both and receive call data from both networks as needed. Further shown is a callback cloud 620 which contains multiple components, including a profile manager 621, environment analyzer 622, callback manager 623, interaction manager 624, and media server 625, which function as described in previous embodiments and, similarly to an on-premise callback stack 610 may be interconnected in various ways as depicted in the diagram, and connected to either a PSTN 203 or the internet 202.

Present in this embodiment is a brand interface server 630, which may expose the identity of, and any relevant API's or functionality for, any of a plurality of connected brands or on-premise callback components 610 which may be responsible for operating related brands, to elements in a callback cloud 620, through the use of an intent analyzer 640 and a broker server 650 to act as an intermediary between a callback cloud 620 and the plurality of other systems, services, or network endpoints 660, 670. In this way, elements of a callback cloud 620 may be able to connect to a broker server 650, and interact more indirectly with systems and applications operating in a business' infrastructure such as a SIP server, which may communicate with a profile manager 621 to determine the exact nature of a user's profiles, sessions, and interactions in the system for added precision regarding their possible availability and most importantly, their identity. A broker server 650 operates as an intermediary between the services and systems of a callback cloud 620 and other external systems or services, such as an intent analyzer 640, PSTN 203, or the Internet 202. Also present in this embodiment is an intent analyzer 640, which analyzes spoken words or typed messages from a user that initiated the callback request, to determine their intent for a callback. For example, their intent may be to have an hour-long meeting, which may factor into the decision by a callback cloud 620 to place a call shortly before one or both users may be required to start commuting to or from their workplace. Intent analysis may utilize any combination of text analytics, speech-to-text transcription, audio analysis, facial recognition, expression analysis, posture analysis, or other analysis techniques, and the particular technique or combination of techniques may vary according to such factors as the device type or interaction type (for example, speech-to-text may be used for a voice-only call, while face/expression/posture analysis may be appropriate for a video call), or according to preconfigured settings (that may be global, enterprise-specific, user-specific, device-specific, or any other defined scope).

Figure 7:
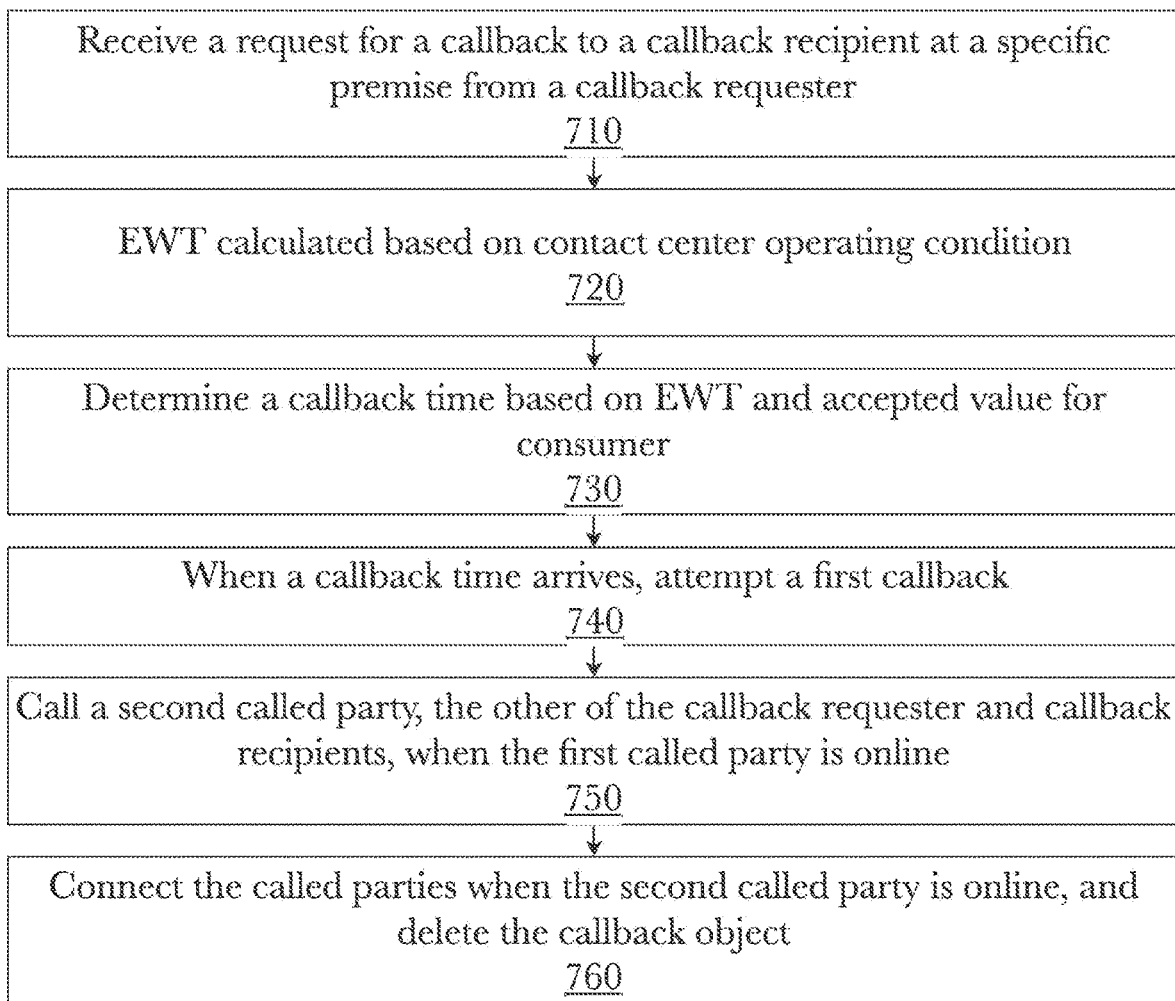
FIG. 7 (PRIOR ART) is a method diagram illustrating steps in the operation of an on-premise callback system.

FIG. 7 (PRIOR ART) is a method diagram illustrating steps in the operation of an on-premise callback system. A consumer may initiate a callback request to a brand handled or managed at a premise 710, such as if a consumer were to place a phone call to customer service for a corporation and the contact center or centers were unable to immediately answer their call. An estimated wait time (EWT) is calculated for consumers in the queue based on the condition of the contact center 720, determining a possible callback time based on the EWT and a consumer-accepted time 730, such as calling a consumer back in 10 minutes when an agent at the premise is available and their spot in the queue is reached

740. Regardless of the specific time chosen, a first callback is attempted 740 when the selected time is reached, calling a first party of either the brand agent or the consumer, followed by calling of the second party if and when the first party comes online 750. When both parties are online they are connected together such as bridging the two phones to a single call 760, and any callback object used to manage the callback data is deleted after the successful callback.

Figure 8:
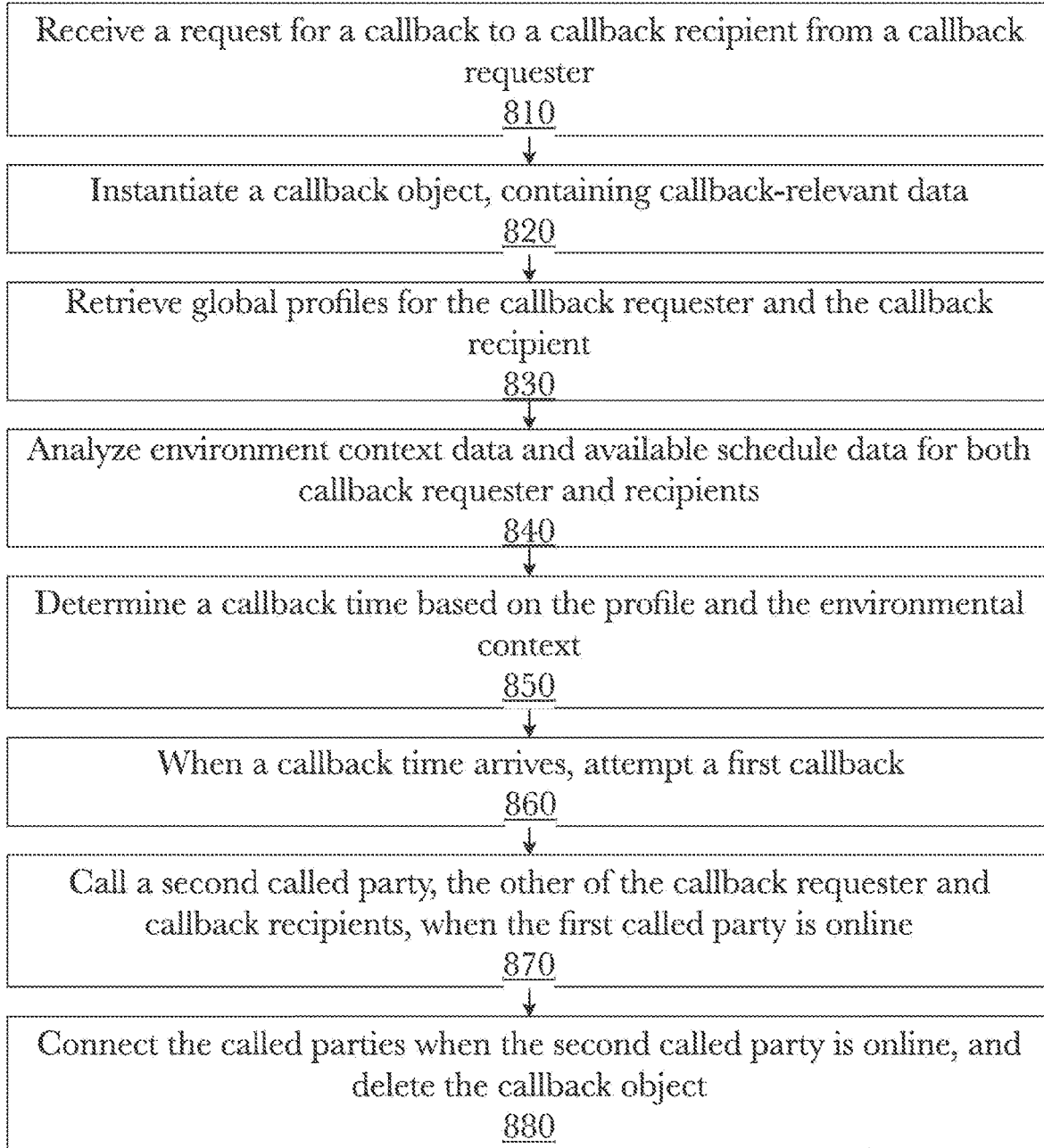
FIG. 8 is a method diagram illustrating the use of a callback cloud for intent-based active callback management, according to an embodiment.

FIG. 8 is a method diagram illustrating the use of a callback cloud for intent-based active callback management, according to an embodiment. According to an embodiment, a callback cloud 320 must receive a request for a callback to a callback recipient, from a callback requester 810. This refers to an individual calling a user of a cloud callback system 320, being unable to connect for any reason, and the system allowing the caller to request a callback, thus becoming the callback requester, from the callback recipient, the person they were initially unable to reach. A callback object is instantiated 820, using a callback manager 323, which is an object with data fields representing the various parts of callback data for a callback requester and callback recipient, and any related information such as what scheduled times may be possible for such a callback to take place. Global profiles may then be retrieved 830 using a profile manager 321 in a cloud callback system, as well as an analysis of environmental context data 840, allowing for the system to determine times when a callback may be possible for a callback requestor and callback recipient both 850. When such a time arrives, a first callback is attempted 860 to the callback requestor or callback recipient, and if this succeeds, a second call is attempted to the second of the callback requestor and callback recipient 870, allowing a media server 325 to bridge the connection when both are online, before deleting the callback object 880.

Figure 9:
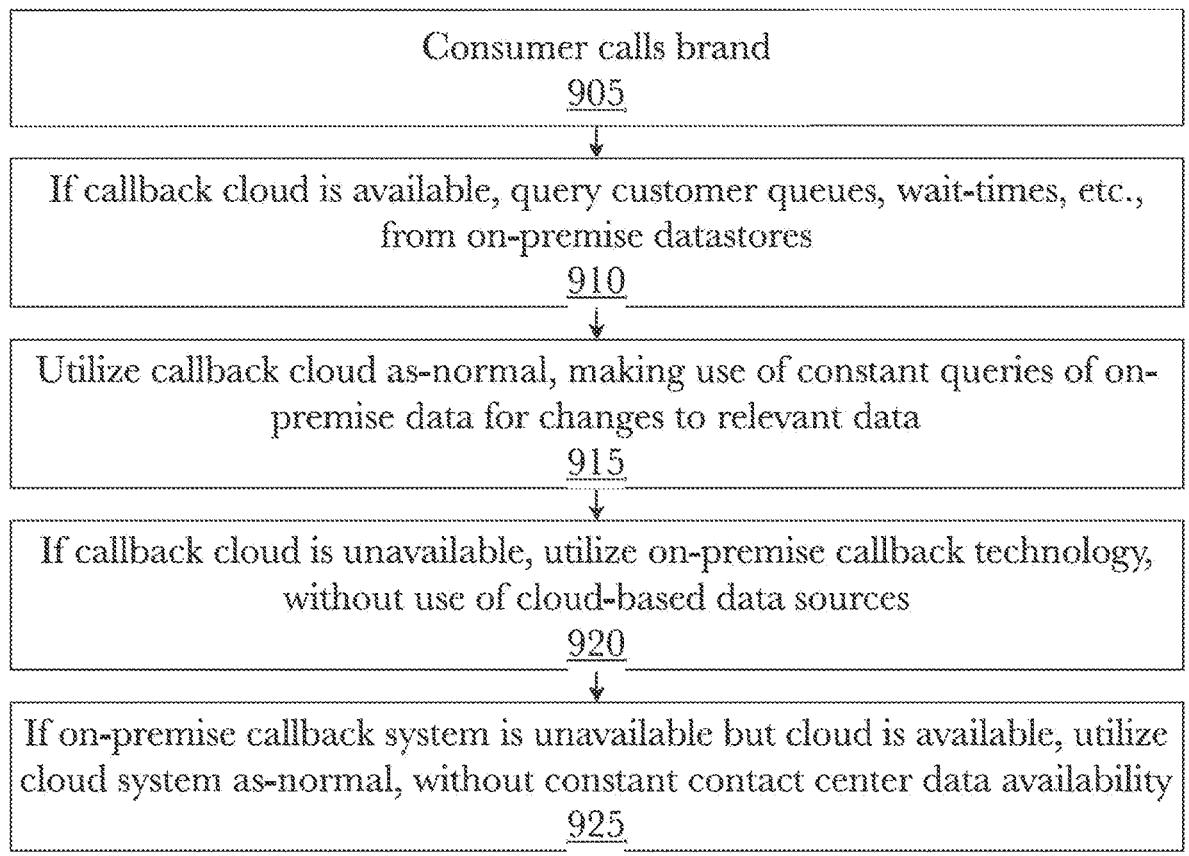
FIG. 9 is a method diagram illustrating the operation of a distributed hybrid callback system architecture utilizing cloud services and on-premise services, according to an embodiment.

FIG. 9 is a method diagram illustrating the operation of a distributed hybrid callback system architecture utilizing cloud services and on-premise services, according to an embodiment. First, a consumer places a call to a brand 905, resulting in on-premise datastores and services being queried by a callback cloud if such a callback cloud is properly configured and online 910. A callback cloud may be utilized normally to manage consumer queues, calculate EWT's, manage agent statuses and their call lengths and queue membership, and other common callback system functions, with the querying of on-premise datastores and services 915. If a callback cloud is unavailable however, an on-premise callback system may be utilized as described in prior art figures, without use of cloud services 920. If a cloud callback system is available and configured, but on-premise callback services are unavailable, a cloud callback system can utilize last-known data such as last-known EWT's and manage consumer callbacks as normal without being able to query new data from on-premise datastores 925, potentially resulting in slightly less consistent or optimal callback handling initially, but still maintaining the system.

Figure 10:
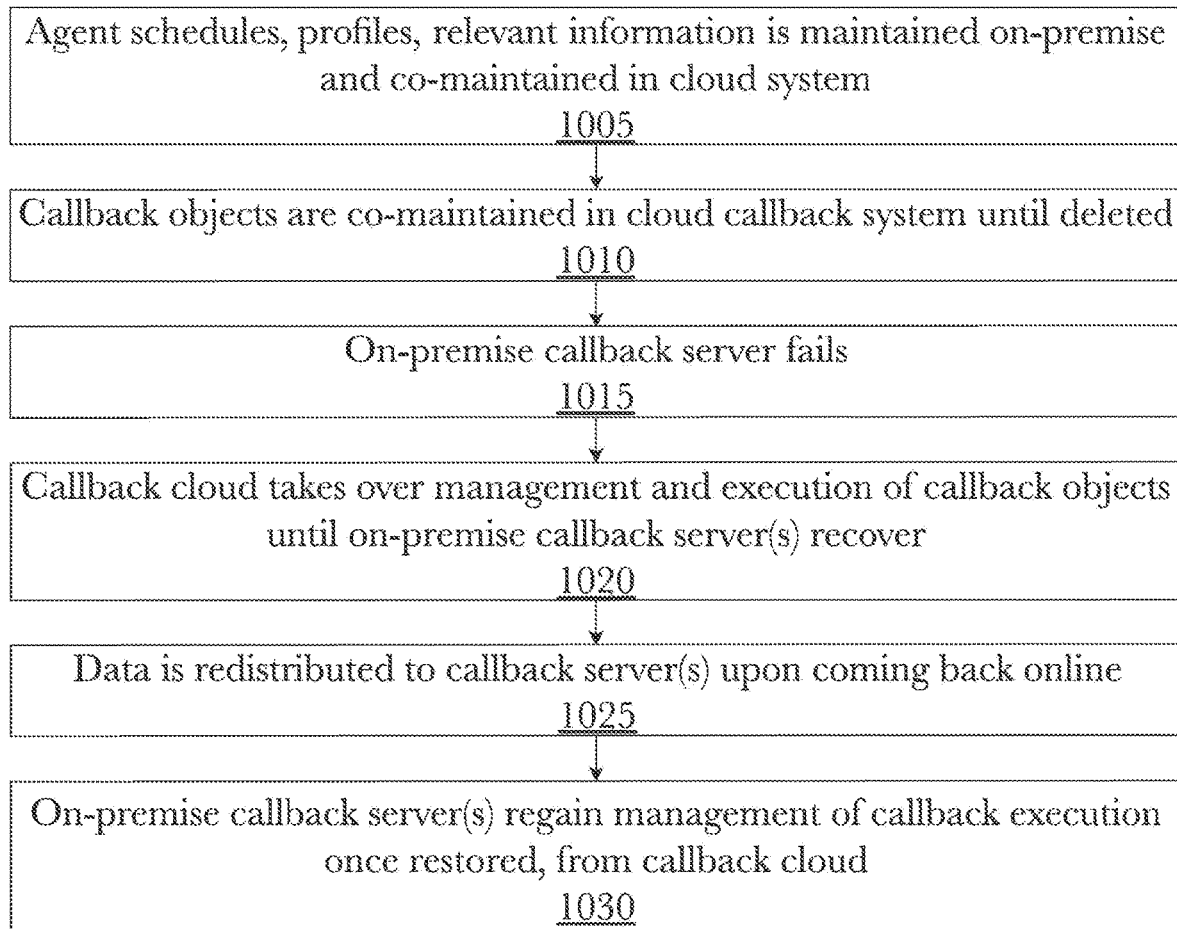
FIG. 10 is a method diagram illustrating the use of callback cloud services to aid in the recovery of an on-premise callback system in the event of a premise callback server failure.

FIG. 10 is a method diagram illustrating the use of callback cloud services to aid in the recovery of an on-premise callback system in the event of a premise callback server failure. Agent data such as schedules and their profiles regarding average call duration are stored on-premise and co-maintained in a cloud callback system 1005. Also co-maintained between a callback cloud and on-premise callback system are callback objects, which hold data regarding a particular callback request including the requester, the time to attempt the callback, and any information regarding the brand or specific agent to perform the callback, if applicable 1010. Should an on-premise callback server fail 1015, a callback cloud may take over management and execution of callback objects until said on-premise callback server recovers 1020, essentially behaving as the new callback system for the contact center. Should a contact center's callback server come back online, data is re-distributed to it from the callback cloud system 1025, with the on-premise server regaining management and execution of callback objects from the callback cloud 1030.

Figure 11:
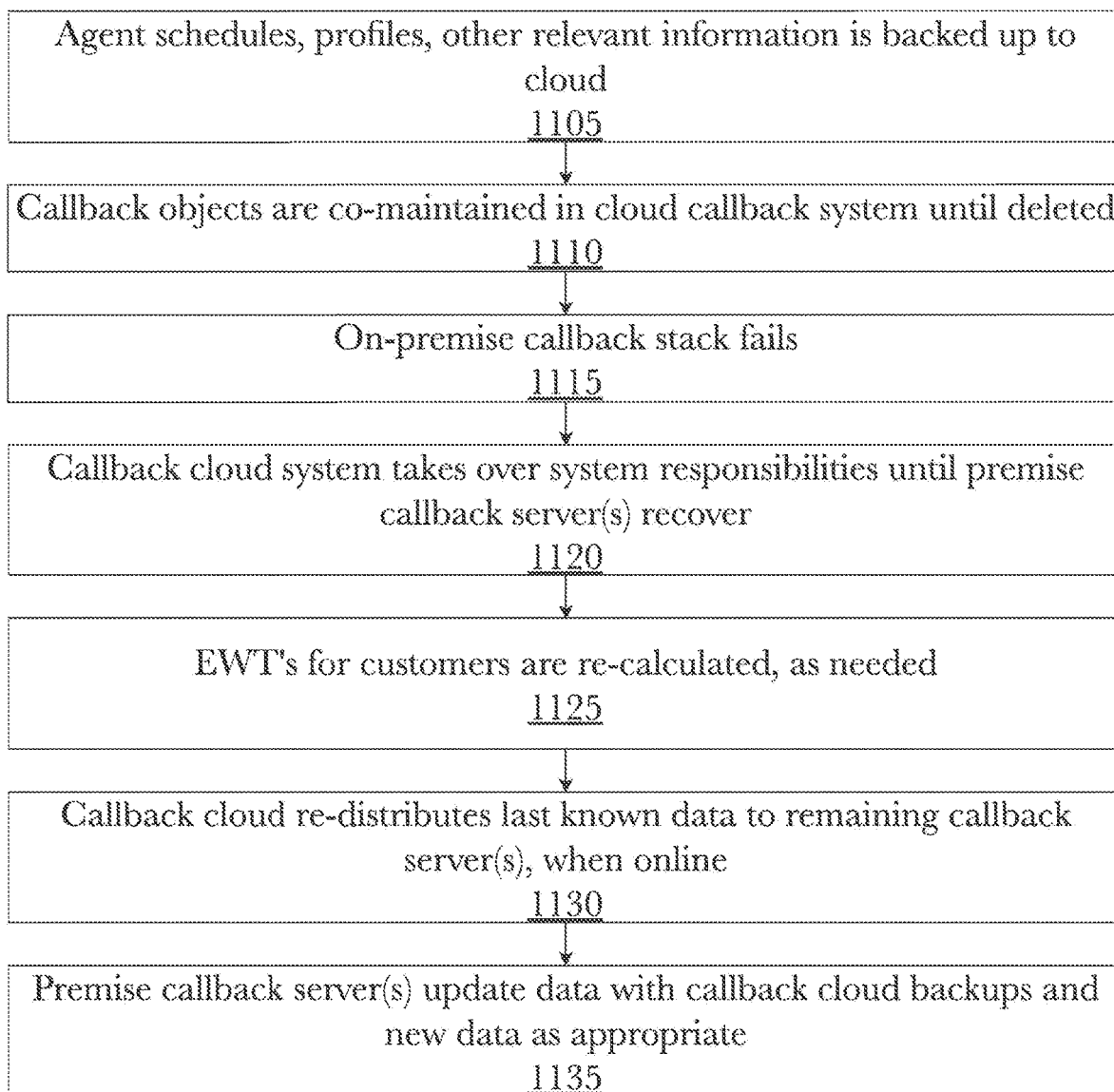
FIG. 11 is a method diagram illustrating the use of callback cloud services to aid in the recovery of an on-premise callback system in the event of a total system failure.

FIG. 11 is a method diagram illustrating the use of callback cloud services to aid in the recovery of an on-premise callback system in the event of a total system failure. Agent data such as schedules and their profiles regarding average call duration are stored on-premise and co-maintained in a cloud callback system 1105. Also co-maintained between a callback cloud and on-premise callback system are callback objects, which hold data regarding a particular callback request including the requester, the time to attempt the callback, and any information regarding the brand or specific agent to perform the callback, if applicable 1110. Should an entire on-premise callback stack fail 1115, a callback cloud may take over management and execution of all callback-related activities including callback execution, EWT calculation 1125, and more 1120, until said on-premise callback stack recovers 1130, essentially behaving as the new callback system for the contact center. Should a contact center's callback stack come back online, data is re-distributed to it from the callback cloud system 1130, with the on-premise server regaining management of callback systems and updating their data from the callback cloud's data as appropriate 1135.

Figure 12:
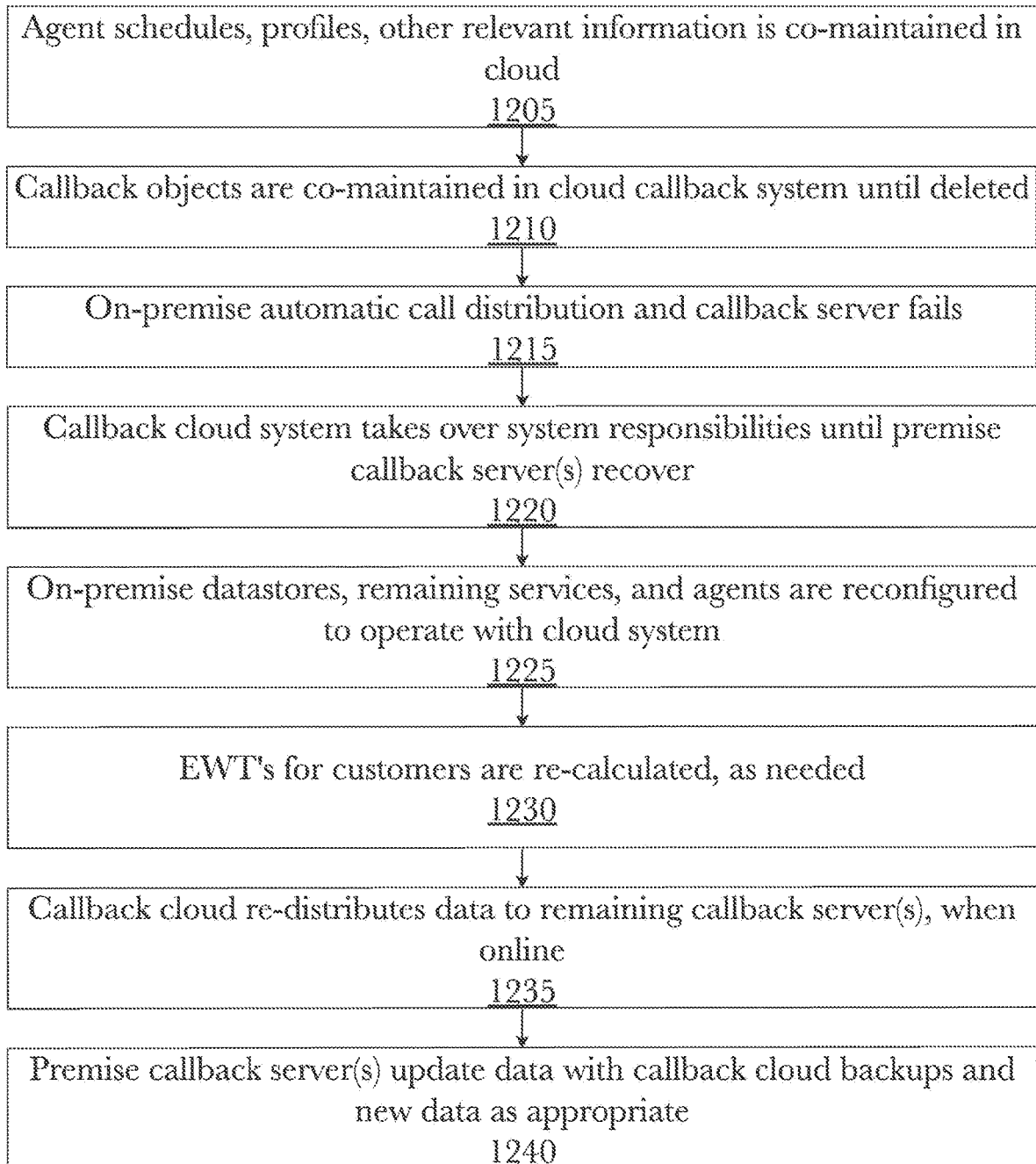
FIG. 12 is a method diagram illustrating the use of callback cloud services to aid in the recovery of an on-premise callback system in the event of a premise automatic call distribution and callback server failure.

FIG. 12 is a method diagram illustrating the use of callback cloud services to aid in the recovery of an on-premise callback system in the event of a premise automatic call distribution and callback server failure. Agent data such as schedules and their profiles regarding average call duration are stored on-premise and co-maintained in a cloud callback system 1205. Also co-maintained between a callback cloud and on-premise callback system are callback objects, which hold data regarding a particular callback request including the requester, the time to attempt the callback, and any information regarding the brand or specific agent to perform the callback, if applicable 1210. Should an on-premise Automatic Call Distribution (ACD) system and callback server fail 1215, a callback cloud may take over management and execution of call distribution and callback-related activities as necessary 1220, with on-site agents interfacing with cloud services for example through a web-browser 1225 and with remaining on-site resources being made available to the cloud infrastructure as needed such as for the purposes of recalculating consumer EWT's 1230, until the on-premise callback stack recovers, essentially behaving as the new callback system for the contact center. Should a contact center's callback stack come back online, data is re-distributed to it from the callback cloud system 1235, with the on-premise server regaining management of callback systems and updating their data from the callback cloud's data as appropriate 1240.

Figure 13:
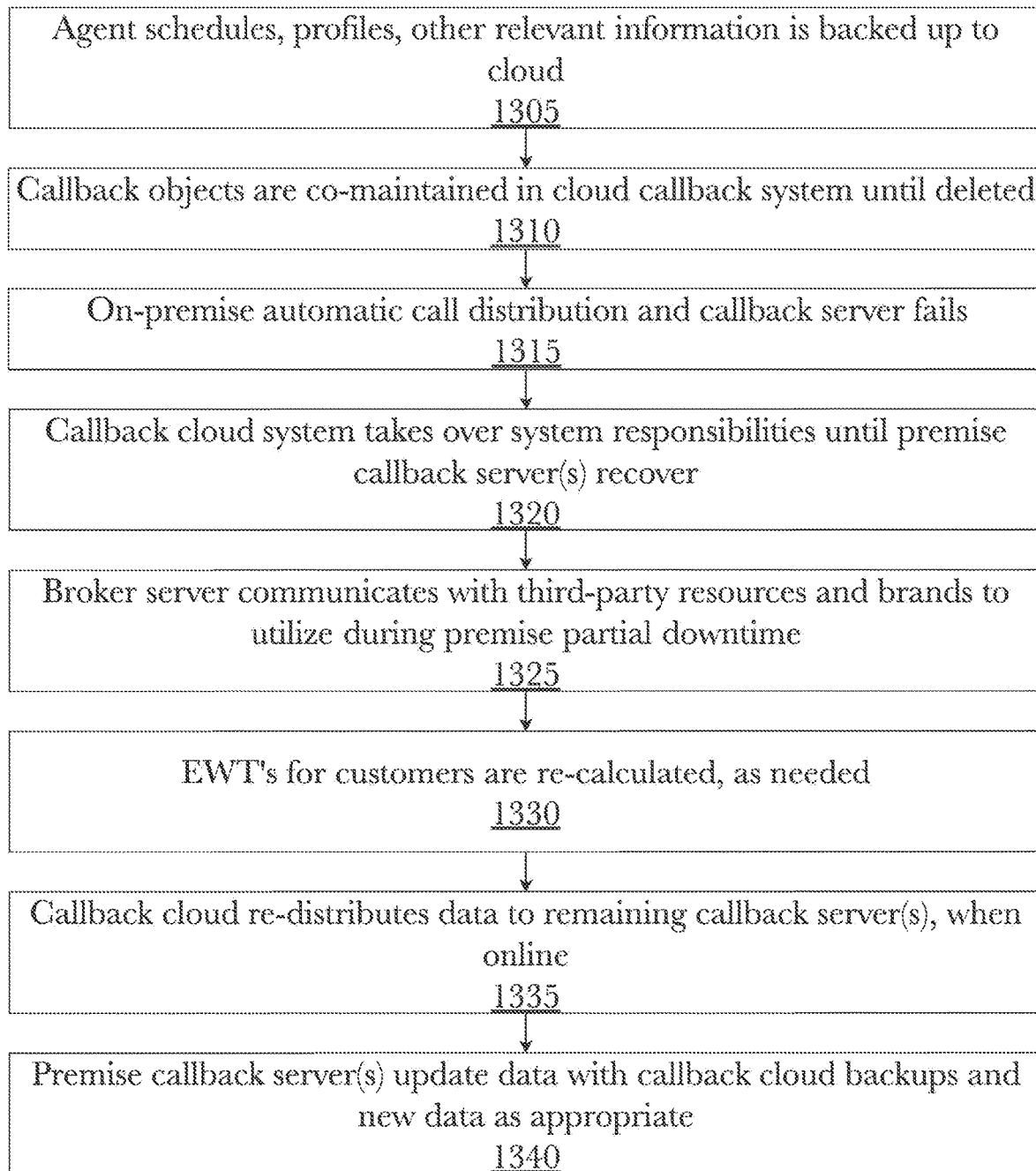
FIG. 13 is a method diagram illustrating the use of callback cloud services to aid in the recovery of an on-premise callback system in the event of a partial system failure, using a broker server to leverage third-party resources for failure recovery.

FIG. 13 is a method diagram illustrating the use of callback cloud services to aid in the recovery of an on-premise callback system in the event of a partial system failure, using a broker server to leverage third-party resources for failure recovery. Agent data such as schedules and their profiles regarding average call duration are stored on-premise and co-maintained in a cloud callback system 1305. Also co-maintained between a callback cloud and on-premise callback system are callback objects, which hold data regarding a particular callback request including the requester, the time to attempt the callback, and any information regarding the brand or specific agent to perform the callback, if applicable 1310. Should an on-premise Automatic Call Distribution (ACD) system and callback server fail 1315, a callback cloud may take over management and execution of call distribution and callback-related activities as necessary 1320, with a broker server interfacing with third-party services such as other contact centers to leverage other resources to manage the load during the premise downtime 1325. Consumer EWT is recalculated if needed 1330, and should a contact center's callback stack come back online, data is re-distributed to it from the callback cloud system 1335, with the on-premise server regaining management of callback systems and updating their data from the callback cloud's data as appropriate 1340.

Figure 14:
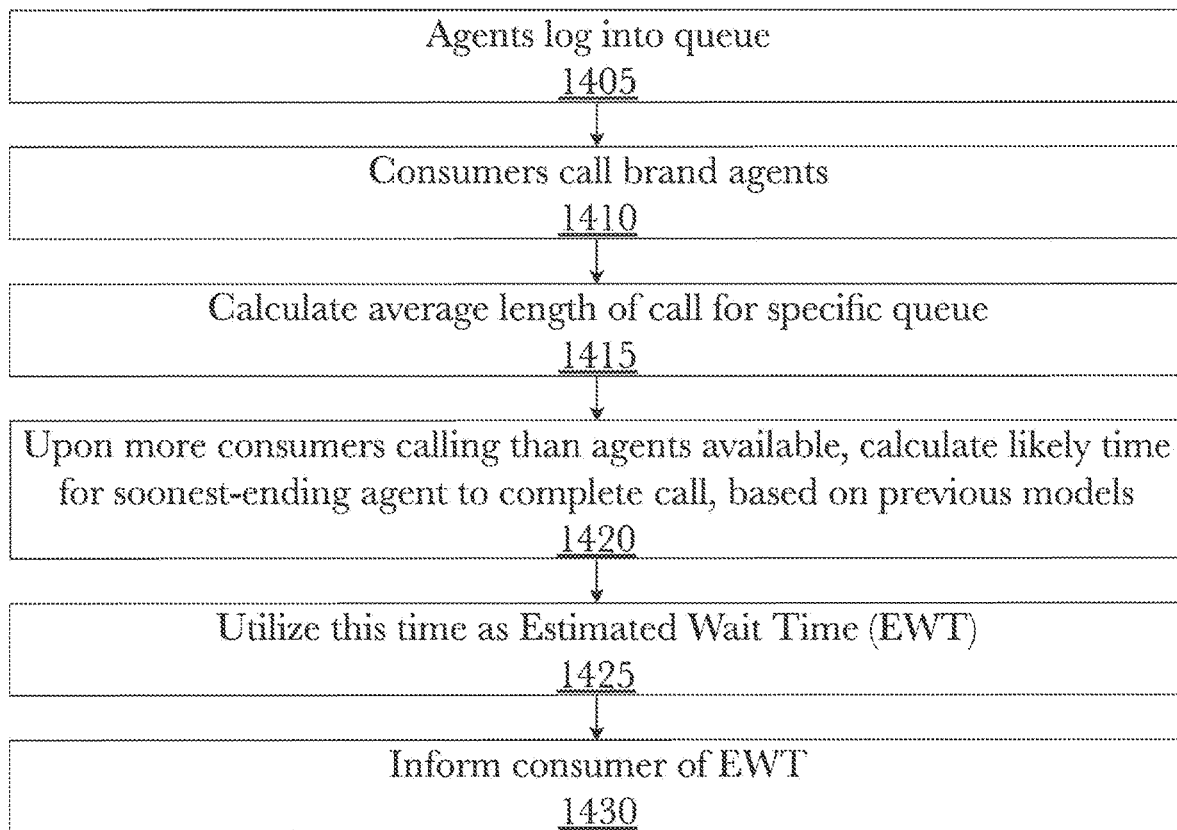
FIG. 14 is a method diagram illustrating calculation and recalculation of an estimated wait-time (EWT) for a distributed callback system.

FIG. 14 is a method diagram illustrating calculation and recalculation of an estimated wait-time (EWT) for a distributed callback system. An agent may log into a queue or be assigned automatically to a queue by a callback manager or call aggregator 1405, allowing consumers to call or open communications with a brand's agents 1410. An average call length for each queue is calculated 1415 utilizing branching averages, for example most calls may be calculated to take 4 minutes, but a call that has already progressed to 3 minutes may be calculated to have a 70% chance of reaching at least 5 minutes in length. Upon more consumers than agents becoming available, or any change in the amount of available agents or consumers in the queue, calculate the time based on these averages that the next available agent will be free to engage in a call with the consumer 1420. This is utilized as the Estimated Wait Time (EWT) for a consumer 1425, and a consumer may be informed of the EWT for callback purposes 1430.

Figure 15:
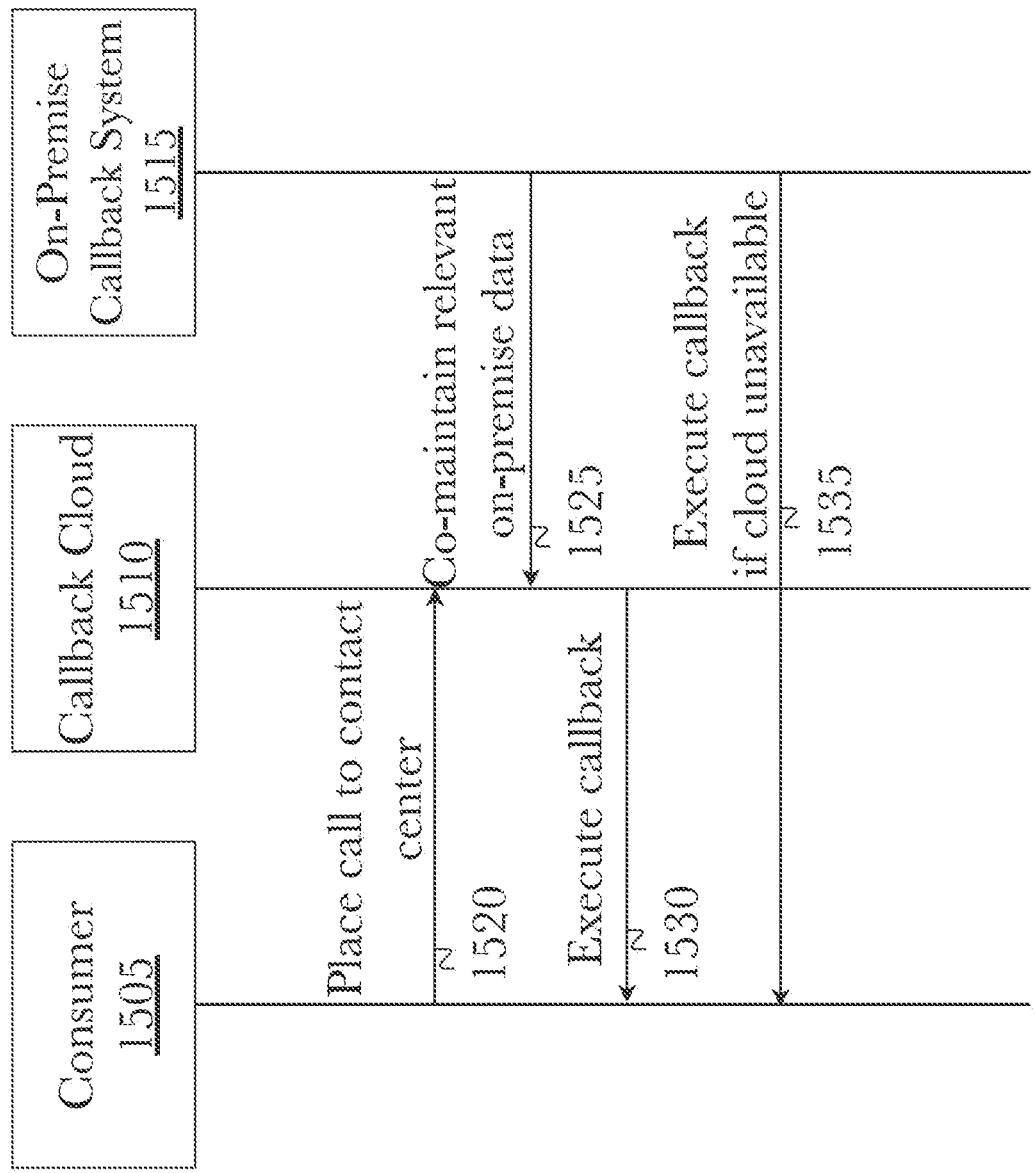
FIG. 15 is a message flow diagram illustrating the operation of a distributed hybrid callback system architecture utilizing cloud services and on-premise services, according to an embodiment.

FIG. 15 is a message flow diagram illustrating the operation of a distributed hybrid callback system architecture utilizing cloud services and on-premise services, according to an embodiment. A consumer 1505, callback cloud 1510, and on-premise callback system 1515 are the principle actors in data transmissions, with specific components of a callback cloud 1510 or on-premise callback system 1515 handling data internally to the respective systems, and a consumer 1505 potentially using one of many common endpoints such as a cellphone, landline phone, PC, tablet, or laptop. A consumer 1505 may place a call from one such endpoint, to a contact center 1520, which may be received by a callback cloud 1510 that is online and managing callback data for a given premise callback system 1515. An on-premise callback system 1515 may co-maintain data including average call times for certain queues, agent availability, agent schedules, and more, with a callback cloud 1525, allowing a callback cloud to execute a callback 1530 to a consumer 1505, connecting agents and consumers with said callbacks as necessary. If a callback cloud is unavailable, an on-premise callback system instead executes the callback 1535, the callback object being used to attempt to open communications with the consumer 1505 and an on-premise agent.

Figure 16:
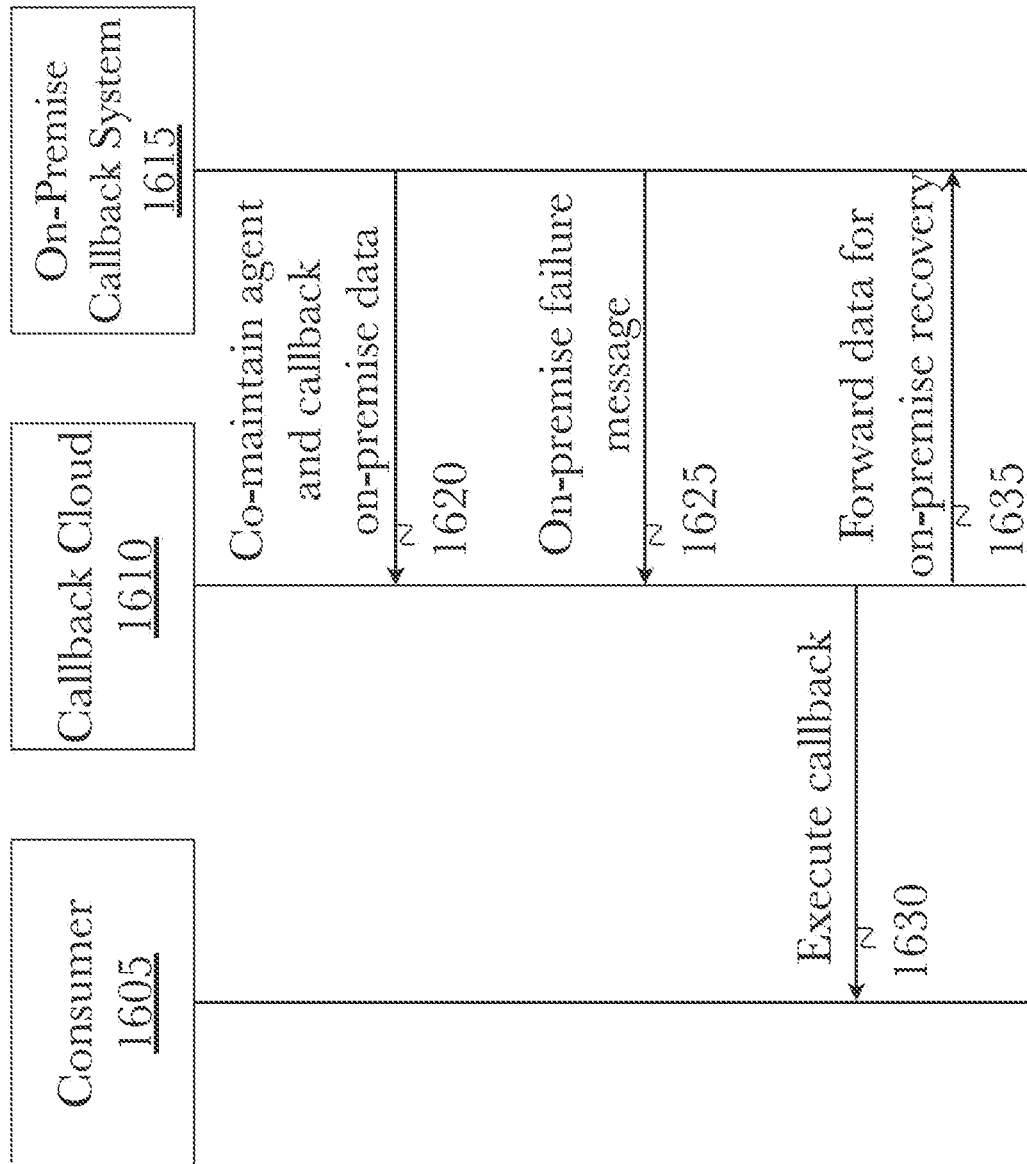
FIG. 16 is a message flow diagram illustrating the use of callback cloud services to aid in the recovery of an on-premise callback system in the event of a premise callback server failure.

FIG. 16 is a message flow diagram illustrating the use of callback cloud services to aid in the recovery of an on-premise callback system in the event of a premise callback server failure. A consumer 1605, callback cloud 1610, and on-premise callback system 1615 are the principle actors in data transmissions, with specific components of a callback cloud 1610 or on-premise callback system 1615 handling data internally to the respective systems, and a consumer 1605 potentially using one of many common endpoints such as a cellphone, landline phone, PC, tablet, or laptop. An on-premise callback system 1615 may continuously co-maintain data including average call times for certain queues, agent availability, agent schedules, and more, with a callback cloud 1620, before a premise callback server may go offline and be unable to execute callbacks to consumers. In such an event, an on-premise failure message 1625 is sent to a callback cloud 1610, informing a callback cloud to execute any consumer callback requests 1630 to a consumer 1605, connecting agents and consumers with said callbacks as necessary. In such an event, the callback cloud may execute customer callbacks using the previously co-maintained data 1635, the callback object being used to attempt to open communications with the consumer 1605 and an on-premise agent. In the event of an on-premise callback server coming back online, current data regarding the brand and on-premise callback data is forwarded back to a premise callback system 1635, for example to update the server with data on completed and yet-to-complete callback requests.

Figure 17:
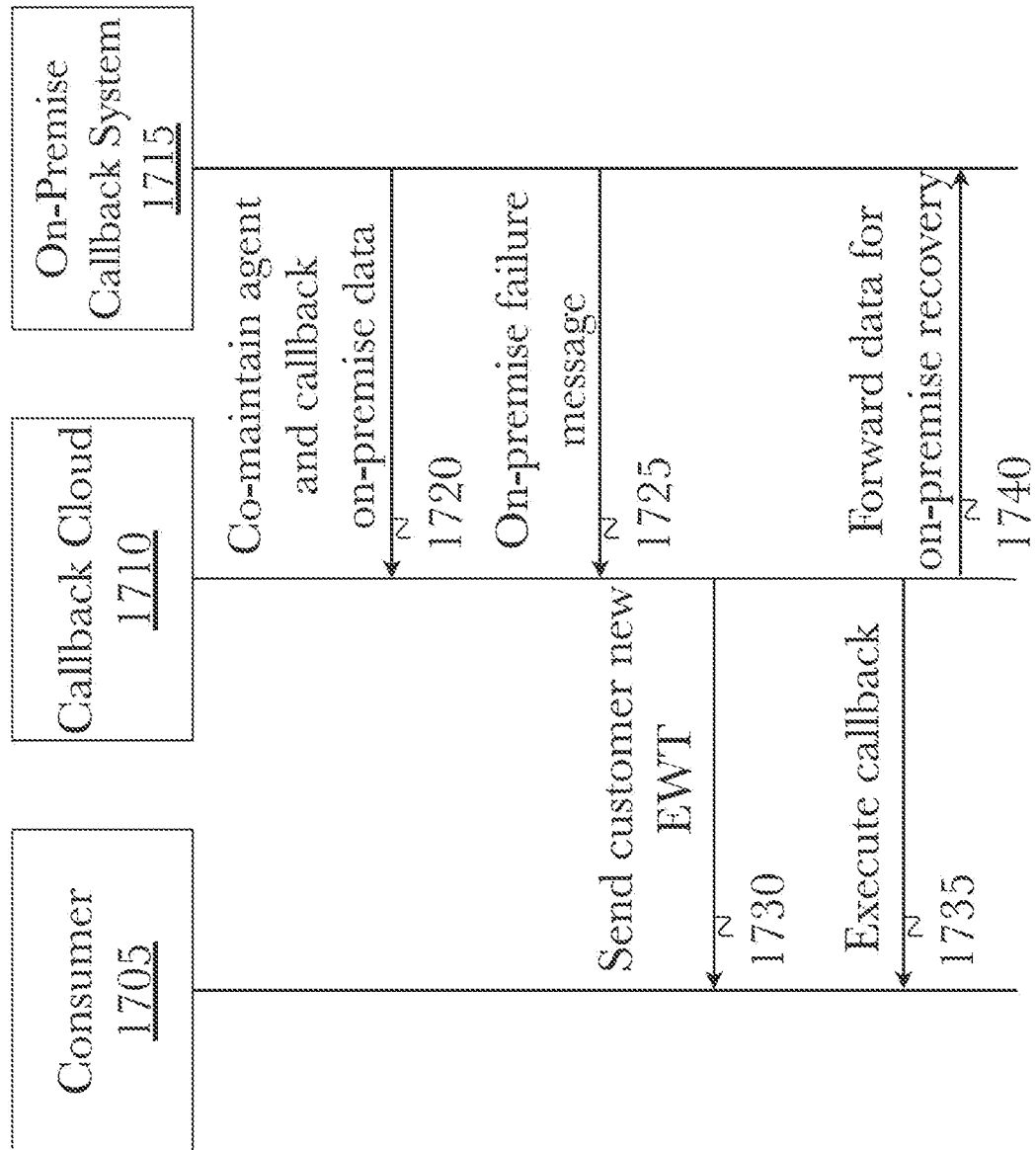
FIG. 17 is a message flow diagram illustrating the use of callback cloud services to aid in the recovery of an on-premise callback system in the event of a total system failure.

FIG. 17 is a message flow diagram illustrating the use of callback cloud services to aid in the recovery of an on-premise callback system in the event of a total system failure. A consumer 1705, callback cloud 1710, and on-premise callback system 1715 are the principle actors in data transmissions, with specific components of a callback cloud 1710 or on-premise callback system 1715 handling data internally to the respective systems, and a consumer 1705 potentially using one of many common endpoints such as a cellphone, landline phone, PC, tablet, or laptop. An on-premise callback system 1715 may continuously co-maintain data including average call times for certain queues, agent availability, agent schedules, and more, with a callback cloud 1720, before total on-premise callback system failure, such as by a power outage affecting their callback system equipment and services. In such an event, an on-premise failure message 1725 is sent to a callback cloud 1710, informing a callback cloud to first re-calculate customer Estimated Wait Times ("EWT") for customers 1730, since call distribution has been interrupted and must now be accomplished by the cloud service. In such an event, the callback cloud may execute customer callbacks using the previously co-maintained data 1735, the callback object being used to attempt to open communications with the consumer 1705 and an on-premise agent. In the event of an on-premise callback server coming back online, current data regarding the brand and on-premise callback data is forwarded back to a premise callback system 1740, for example to update the server with data on completed and yet-to-complete callback requests.

Figure 18:
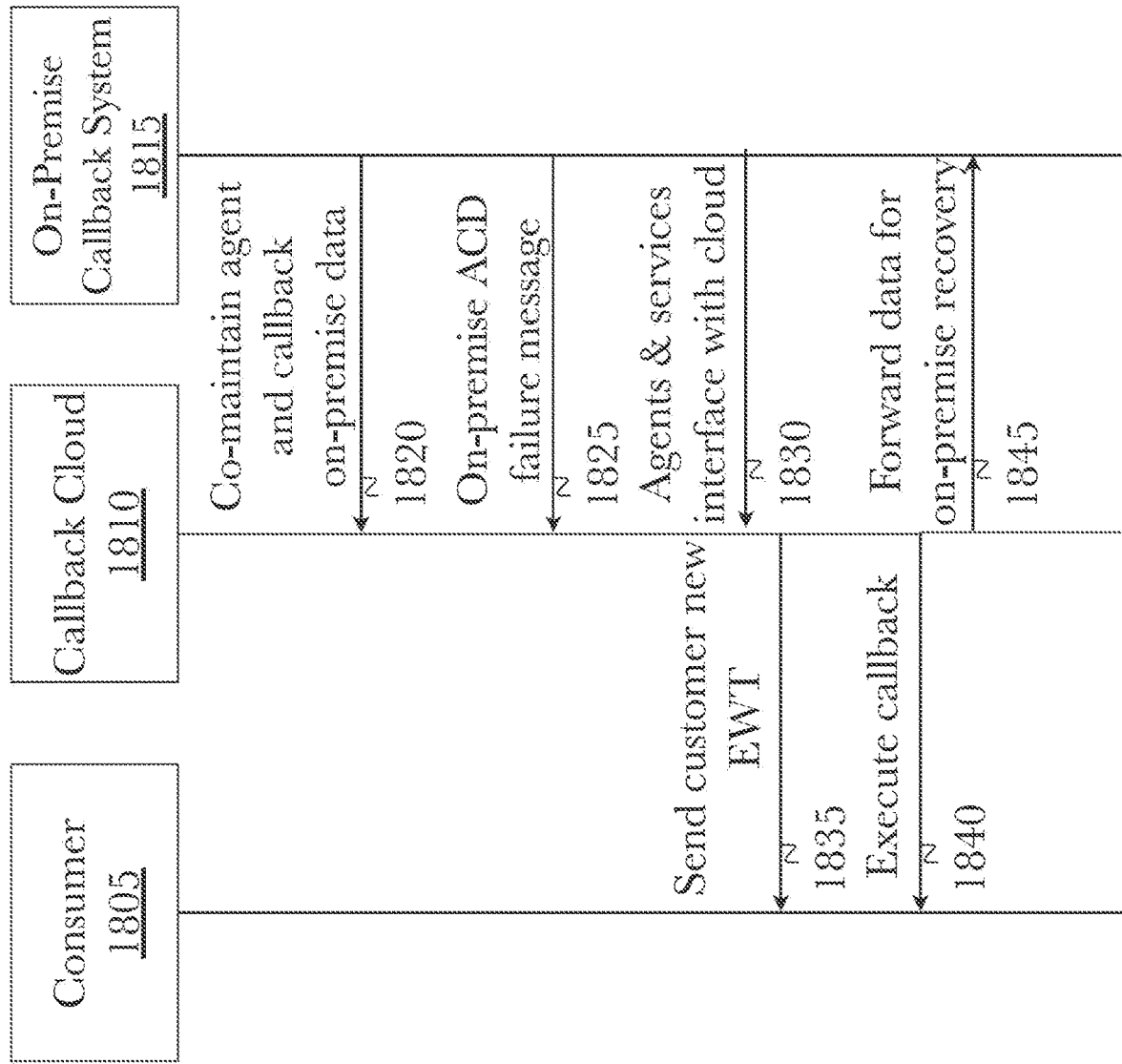
FIG. 18 is a message flow diagram illustrating the use of callback cloud services to aid in the recovery of an on-premise callback system in the event of a premise automatic call distribution and callback server failure.

FIG. 18 is a message flow diagram illustrating the use of callback cloud services to aid in the recovery of an on-premise callback system in the event of a premise automatic call distribution and callback server failure. A consumer 1805, callback cloud 1810, and on-premise callback system 1815 are the principle actors in data transmissions, with specific components of a callback cloud 1810 or on-premise callback system 1815 handling data internally to the respective systems, and a consumer 1805 potentially using one of many common endpoints such as a cellphone, landline phone, PC, tablet, or laptop. An on-premise callback system 1815 may continuously co-maintain data including average call times for certain queues, agent availability, agent schedules 1830, and more, with a callback cloud 1820, before on-premise Automatic Call Distribution ("ACD") and callback servers may go offline and be unable to execute callbacks to consumers or adequately manage incoming calls. In such an event, an on-premise failure message 1825 is sent to a callback cloud 1810, informing a callback cloud to first 1835 re-calculate customer Estimated Wait Times ("EWT") for customers, since call distribution has been interrupted and must now be accomplished by the cloud service. In such an event, the callback cloud may execute customer callbacks using the previously co-maintained data 1840, the callback object being used to attempt to open communications with the consumer 1805 and an on-premise agent. In the event of an on-premise callback server coming back online, current data regarding the brand and on-premise callback data is forwarded back to a premise callback system 1845, for example to update the server with data on completed and yet-to-complete callback requests.

Figure 19:
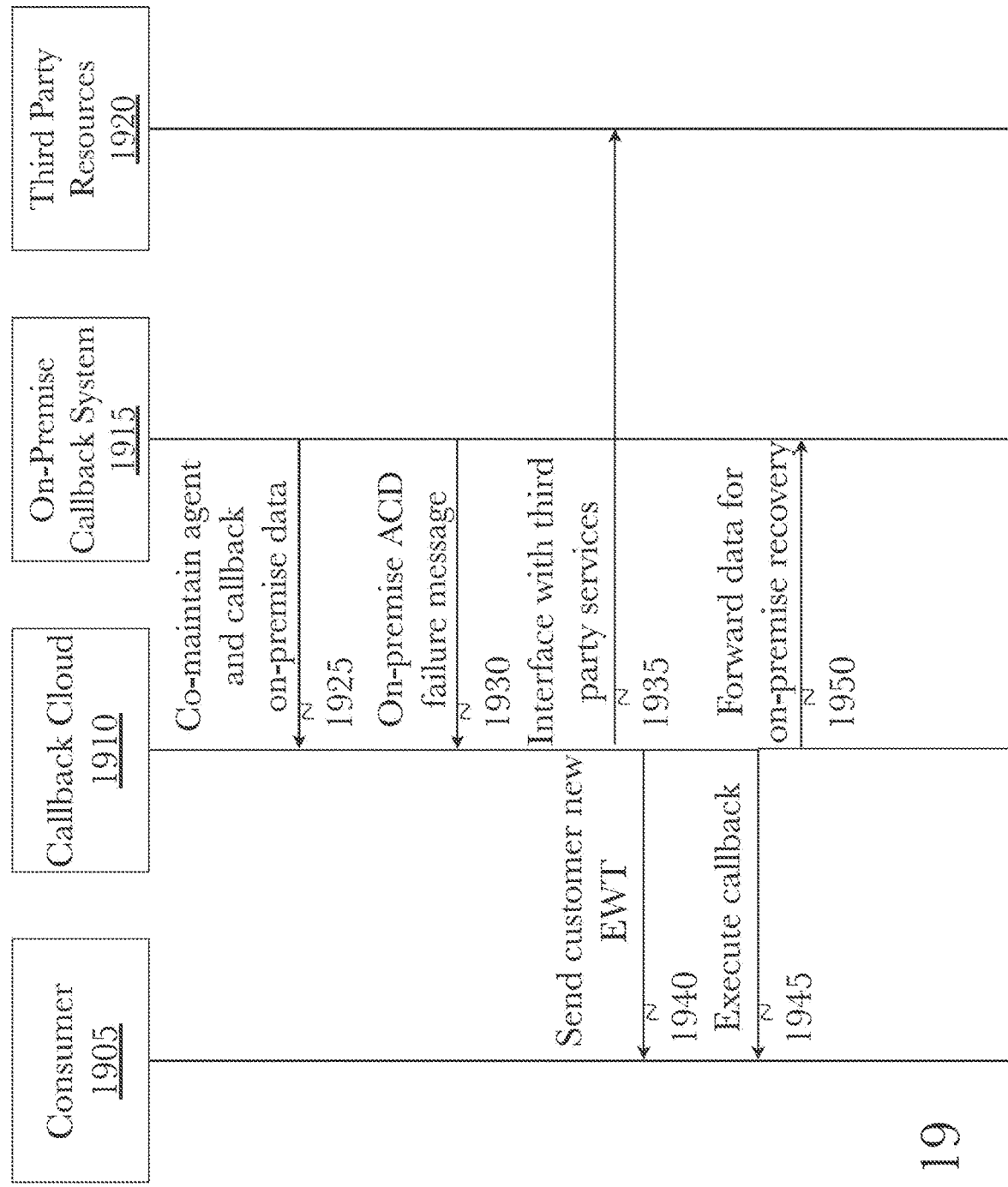
FIG. 19 is a message flow diagram illustrating the use of callback cloud services to aid in the recovery of an on-premise callback system in the event of a partial system failure, using a broker server to leverage third-party resources for failure recovery.

FIG. 19 is a message flow diagram illustrating the use of callback cloud services to aid in the recovery of an on-premise callback system in the event of a partial system failure, using a broker server to leverage third-party resources for failure recovery. A consumer 1905, callback cloud 1910, and on-premise callback system 1915 are the principle actors in data transmissions, with specific components of a callback cloud 1910 or on-premise callback system 1915 handling data internally to the respective systems, and a consumer 1905 potentially using one of many common endpoints such as a cellphone, landline phone, PC, tablet, or laptop. An on-premise callback system 1915 may continuously co-maintain data 1925 including average call times for certain queues, agent availability, agent schedules, and more, with a callback cloud 1910, before on-premise Automatic Call Distribution ("ACD") and callback servers may go offline and be unable to execute callbacks to consumers or adequately manage incoming calls. In such an event, an on-premise failure message 1930 is sent to a callback cloud 1910, informing a callback cloud to first re-calculate customer Estimated Wait Times ("EWT") for customers 1940, since call distribution has been interrupted and must now be accomplished by the cloud service. Prior to calculating a new EWT time, callback cloud 1910 may interface with third party resources 1920 in order to capture a state of the third party resources at the time of failure, as well as to capture any data and metadata associated with third party services prior to a failure event. In such an event, the callback cloud may execute customer callbacks using the previously co-maintained data 1945, the callback object being used to attempt to open communications with the consumer 1905 and an on-premise agent. In the event of an on-premise callback server coming back online, current data regarding the brand and on-premise callback data is forwarded back to a premise callback system 1950, for example to update the server with data on completed and yet-to-complete callback requests.

Figure 20:
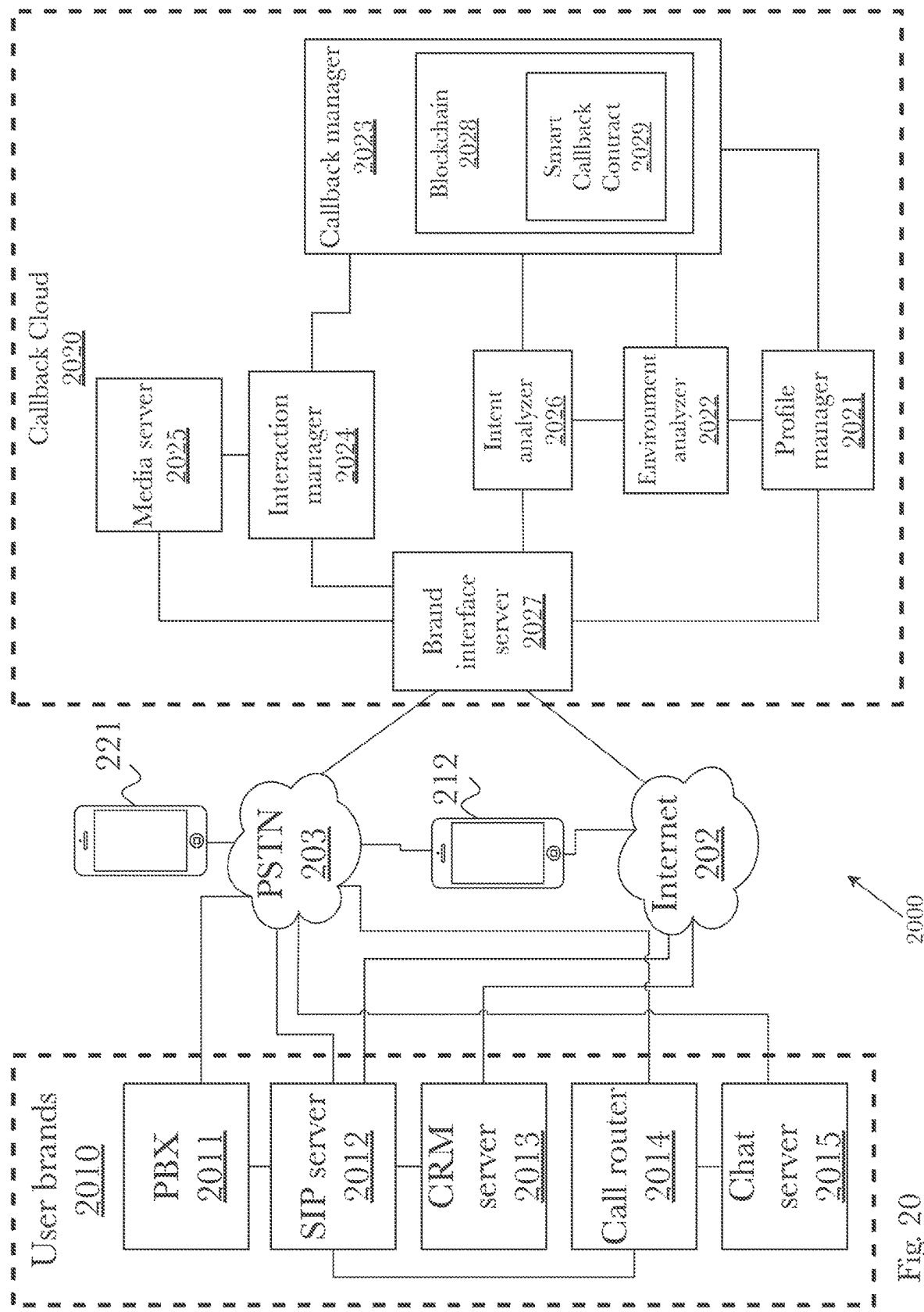
FIG. 20 is a block diagram illustrating an exemplary system architecture for operating a callback cloud utilizing smart callbacks, according to one aspect.

FIG. 20 is a block diagram illustrating an exemplary system 2000 architecture for operating a callback cloud utilizing smart callbacks, according to one embodiment. System 2000 may be used to negotiate a session establishment and broker communications between and among users such that system users can quickly and efficiently have their needs met. In this diagram (referring to FIG. 20) an exemplary system 2000 arrangement is shown as a callback cloud 2020 operating over a public switched telephone network and the Internet, and connecting to a variety of other brand devices and services, according to an embodiment. A collection of user brands 2010 may be present either singly or in some combination, possibly including a Public Branch Exchange ("PBX") 2011, a Session Initiation Protocol ("SIP") server 2012, a Customer Relationship Management ("CRM") server 2013, a call router 2014, or a chat server 2015, or some combination of these brands. These brands 2010 may communicate over a combination of, or only one of, a Public Switched Telephone Network ("PSTN") 203, and the Internet 202, to communicate with other devices including a callback cloud 2020, a company phone 221, or a personal cellular phone 212. A SIP server 2012 is responsible for initiating, maintaining, and terminating sessions of voice, video, and text or other messaging protocols, services, and applications, including handling of PBX 2011 phone sessions, CRM server 2013 user sessions, and calls forwarded via a call router 2014, all of which may be used by a business to facilitate diverse communications requests from a user or users, reachable by phone 221, 212 over either PSTN 203 or the Internet 202. A chat server 2015 may be responsible for maintaining one or both of text messaging with a user, and automated voice systems involving technologies such as an Automated Call Distributor ("ACD"), forwarding relevant data to a call router 2014 and CRM server 2013 for further processing, and a SIP server 2012 for generating communications sessions not run over the PSTN 203. Various systems may also be used to monitor their respective interactions (for example, chat session by a chat server 2015 or phone calls by an ACD or SIP server 2012), to track agent and resource availability for producing EWT estimations.

When a user calls from a mobile device 212 or uses some communication application such as (for example, including but not limited to) SKYPE™ or instant messaging, which may also be available on a laptop or other network endpoint other than a cellular phone 212, they may be forwarded by brand interface server 2027 to brands 2010 operated by a business in the manner described herein. For example, a cellular phone call may be placed over PSTN 203 and received by brand interface server 2027 before being handled by a call router 2014 and generating a session with a SIP server 2012, the SIP server creating a session with a callback cloud 2020 with a profile manager 2021 if the call cannot be completed, resulting in a callback being required. A brand interface server 2027 in a callback cloud 2020 receives initial requests to connect to callback cloud 2020 and instructs profile manager 2021 to forward relevant user profile information to a callback manager 2023, which may further request environmental context data from an environment analyzer 2022. Environmental context data may include (for example, and not limited to) recorded information about when a callback requester or callback recipient may be suspected to be driving or commuting from work, for example, and may be parsed from online profiles or online textual data, using an environment analyzer 2022.

A callback manager 2023 centrally manages all callback data, creating a smart callback contract 2029 which may be used to execute a workflow and manage the data for a particular callback, and communicates with an interaction manager 2024 which handles requests to make calls and bridge calls, which go out to a media server 2025 which actually makes the calls as requested. In this way, the media server 2025 may be altered in the manner in which it makes and bridges calls when directed, but the callback manager 2023 does not need to adjust itself, due to going through an intermediary component, the interaction manager 2024, as an interface between the two. A media server 2025, when directed, may place calls and send messages, emails, or connect voice over IP ("VoIP") calls and video calls, to users over a PSTN 203 or the Internet 202.

Present in this embodiment is a brand interface server 2027, which may expose the identity of, and any relevant API's or functionality for, any of a plurality of connected brands 2010, to elements in a callback cloud 2020. In this way, elements of a callback cloud 2020 may be able to connect to, and interact more directly with, systems and applications operating in a business' infrastructure such as a SIP server 2012, which may be interfaced with a profile manager 2021 to determine the exact nature of a user's profiles, sessions, and interactions in the system for added precision regarding their possible availability and most importantly, their identity. Also present in this embodiment is an intent analyzer 2026, which analyzes spoken words or typed messages from a user that initiated the callback request, to determine their intent for a callback. For example, their intent may be to have an hour-long meeting, which may factor into the decision by a callback cloud 2020 to place a call shortly before one or both users may be required to start commuting to or from their workplace. Intent analysis may utilize any combination of text analytics, speech-to-text transcription, audio analysis, facial recognition, expression analysis, posture analysis, or other analysis techniques, and the particular technique or combination of techniques may vary according to such factors as the device type or interaction type (for example, speech-to-text may be used for a voice-only call, while face/expression/posture analysis may be appropriate for a video call), or according to preconfigured settings (that may be global, enterprise-specific, user-specific, device-specific, or any other defined scope).

According to an embodiment, callback manager 2023 may utilize and orchestrate blockchain 2028 technology to improve end user experience, satisfaction, and security when interacting with an enterprise 220 such as a contact center. According to some embodiments, the blockchain 2028 may be implemented as a private blockchain. Operating a private blockchain, callback cloud 2020 is able to read and write data contained within the private blockchain in order to create and manage smart callback contracts 2029. Smart callback contracts 2029 may be implemented using smart contract technology. Smart contracts work by following simple "if/when . . . then . . . " statements that are written into code on a blockchain. A network of computers (e.g., callback cloud 2020) executes the actions when predetermined conditions have been met and verified. These actions could include, but are not limited to, releasing funds to the appropriate parties, applying a change of service, updating a user profile, executing a scheduled callback between the appropriate parties, sending notifications, and routing requests. The blockchain is then updated when the transaction is completed. That means the transaction cannot be changed, and only parties who have been granted permission can see the results.

Callback cloud 2020 may utilize a root smart callback contract 2029 template that can be configured to execute a callback using information specific to a given callback request. The root template may be comprised of a plurality of default fields which may be populated with user or enterprise-specific information during smart callback contract creation. For example, in one embodiment, default fields may include, but are not limited to, participating parties' identities (e.g., callback requestor and a callback recipient), participants contact information (e.g., phone number, extension number, email address, social media handle, etc.), communication device(s), method of communication (e.g., phone call, email, SMS message, VoIP call, etc.), scheduled callback time, brand information (e.g., from brand interface server 2027), context data (e.g., environmental and intent context, historical user profile data, past interactions, links to previous smart callback contracts, etc.). By utilizing a root template, callback cloud 2020 can efficiently and dynamically create extensible smart callback contracts 2029 for both simple and complex callback use cases.

According to an embodiment, the root contract template may comprise pre-coded logic and/or computer readable instructions which may perform a variety of actions, such as executing a callback via a smart callback contract 2029. The pre-coded logic and/or computer readable instructions may be completed when one or more default data fields are populated with information. What this means is that the behavior of the smart contract 2029 created using the root template is at least partially determined based off the values input into the default fields. For example, a root smart callback contract 2029 template has pre-coded logic to execute when a certain trigger occurs, the trigger being a specified time, and wherein the time value to be used within the pre-coded trigger event logic is the scheduled callback time that was input into the corresponding default field during smart callback contract 2029 construction. As another example, the root smart callback contract 2029 template has pre-coded logic to connect two parties via method of communication, wherein the method of communication default field value determines the underlying logic used to connect two parties, such as method of communication being email which would have different connecting logic than a method of communication being a phone call. In this way, system 2000 can use a root contract template from which to create a broad range of smart contracts in order to negotiate session establishment between and among a plurality of individual users, enterprises and their systems, and brands.

According to an embodiment, the callback cloud 2020 can be or may include any servers that can be used to keep a digital ledger. A digital ledger is where multiple copies of the same blockchain(s) 2028 are stored on separate servers in order to validate a transaction (e.g., execution of a callback). The digital ledger typically has copies of a single blockchain 2028 that is used for all transactions (for multiple users of the contact center) in a contact center or other enterprise 220. When a new transaction occurs in the callback cloud 2020, if the transaction is validated, a new block is added to the blockchains 2028 on each of the servers to keep a record of the transaction. In one embodiment there may be a separate blockchain 2028 associated with each user and stored as part of a user profile.

Callback manager 2023 may receive, retrieve, or otherwise obtain and work with a user's profile as managed by a profile manager 2021, with environmental context from an environment analyzer 2022, with intent as determined from intent analyzer 2026 as well as (if provided) EWT information for any callback recipients (for example, contact center agents with the appropriate skills to address the callback requestor's needs, or online tech support agents to respond to chat requests), to determine an appropriate callback time for the two users (a callback requestor and a callback recipient), interfacing with an interaction manager 2024 to physically place and bridge the calls with a media server 2025. When a callback is requested by a system user, callback manager 2023 may populate the fields of a smart callback contract 2029 with the obtained user profile information, the environmental and intent context, and a scheduled callback time based on EWT information (if provided). Smart callback contracts 2029 may be triggered to connect a callback requestor with a callback recipient when the scheduled callback time occurs. When the scheduled callback time occurs the code (i.e., machine readable instructions) within the smart callback contract 2029 may cause interaction manager 2024 to bridge the callback request and then connect the two parties using media server 2025. After the parties have been connected, the smart callback contract may then be validated and added to the blockchain 2028 digital ledger by callback manager 2023. In this way, a user may communicate via the callback cloud 2020 with another user on a PBX system 2011, or with automated services hosted on a chat server 2015, and if they do not successfully place their call or need to be called back by a system, a callback cloud 2020 may find an optimal time to bridge a call between the callback requestor and callback recipient, as necessary.

Figure 21:
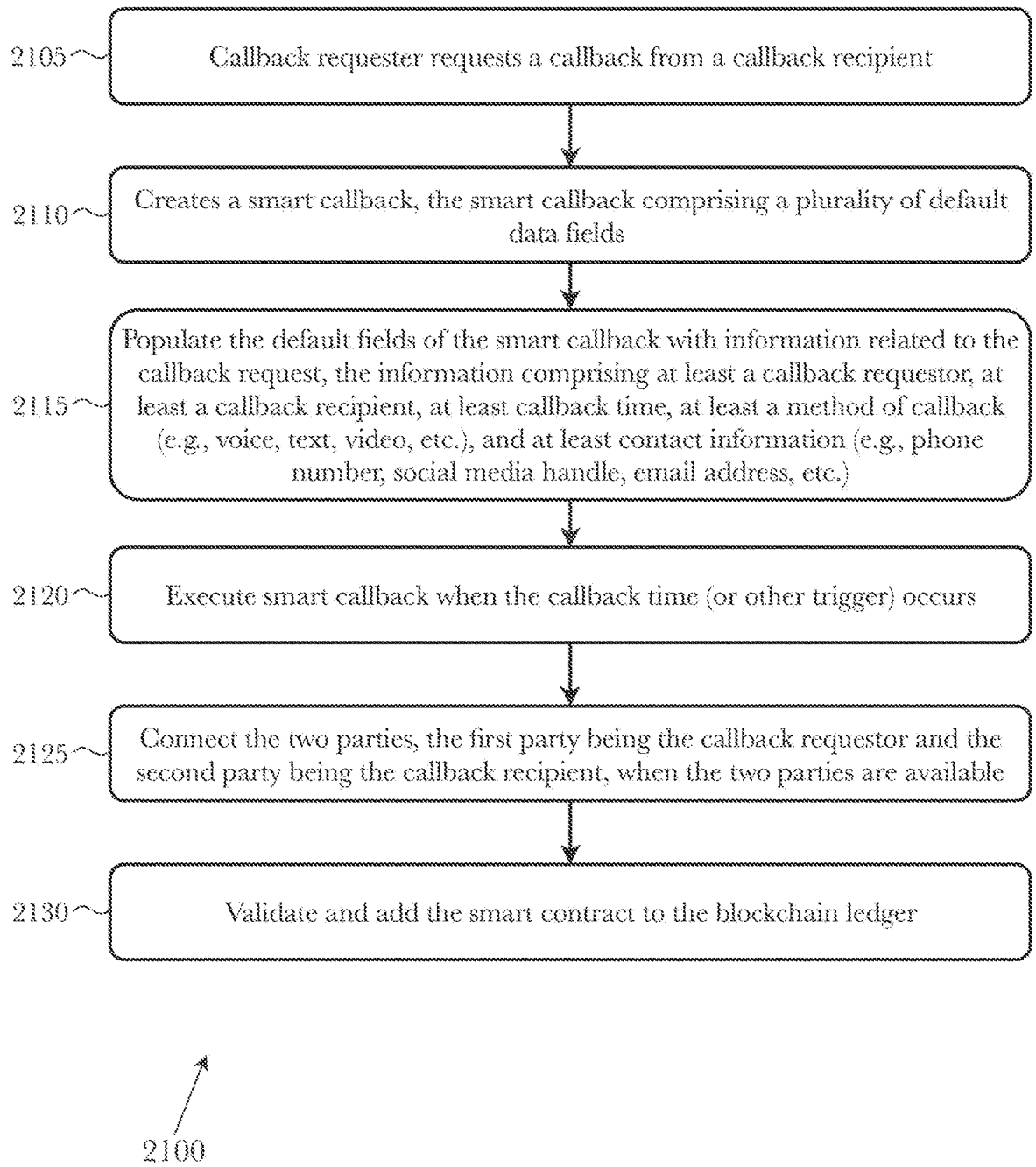
FIG. 21 is a method diagram illustrating an exemplary method for creating and executing a smart callback responsive to a callback request, according to an embodiment.

FIG. 21 is a method diagram illustrating an exemplary method 2100 for creating and executing a smart callback responsive to a callback request, according to an embodiment. According to an embodiment, the process begins when a callback requestor requests a callback from a callback recipient 2105. In response, brand interface server 2027 may generate a callback request which may then be sent to callback manager 2023. Callback manager 2023 receives the callback request and in turn creates a smart callback, the smart callback comprising a plurality of default data fields 2110. As a next step, callback manager 2023 may populate the default data fields of the smart callback with information related to the callback request 2115. In some embodiments, the information may comprise at least a callback requestor, at least a callback recipient, at least a callback time, at least a method callback (e.g., voice, text, video, etc.), and at least contact information (e.g., phone number, social media handle, email address, etc.). This and other information may be gathered, inferred, determined, or otherwise obtained from various system 2000 components, such as, for example, environment analyzer 2022, intent analyzer 2026, profile manager 2021, brand interface server 2027, and various user brands 2010. The next step is to execute the smart callback when a pre-determined trigger event occurs, such as when a scheduled callback time arrives 2120. Callback manager 2023 may be used to maintain smart callbacks until they have executed, and may be used to monitor smart contract execution. When the smart callback executes, the two parties may be connected when the two parties are available 2125, the first party being a callback requestor and the second party being the callback recipient. Upon successful execution, callback manager 2023 may validate the smart callback transaction and then add the smart contract to the blockchain 2028 ledger 2130. In this way, a callback cloud utilizing smart callback contracts may process and route requests while also providing autonomous callback management executed as smart contract workflows.

Figure 22:
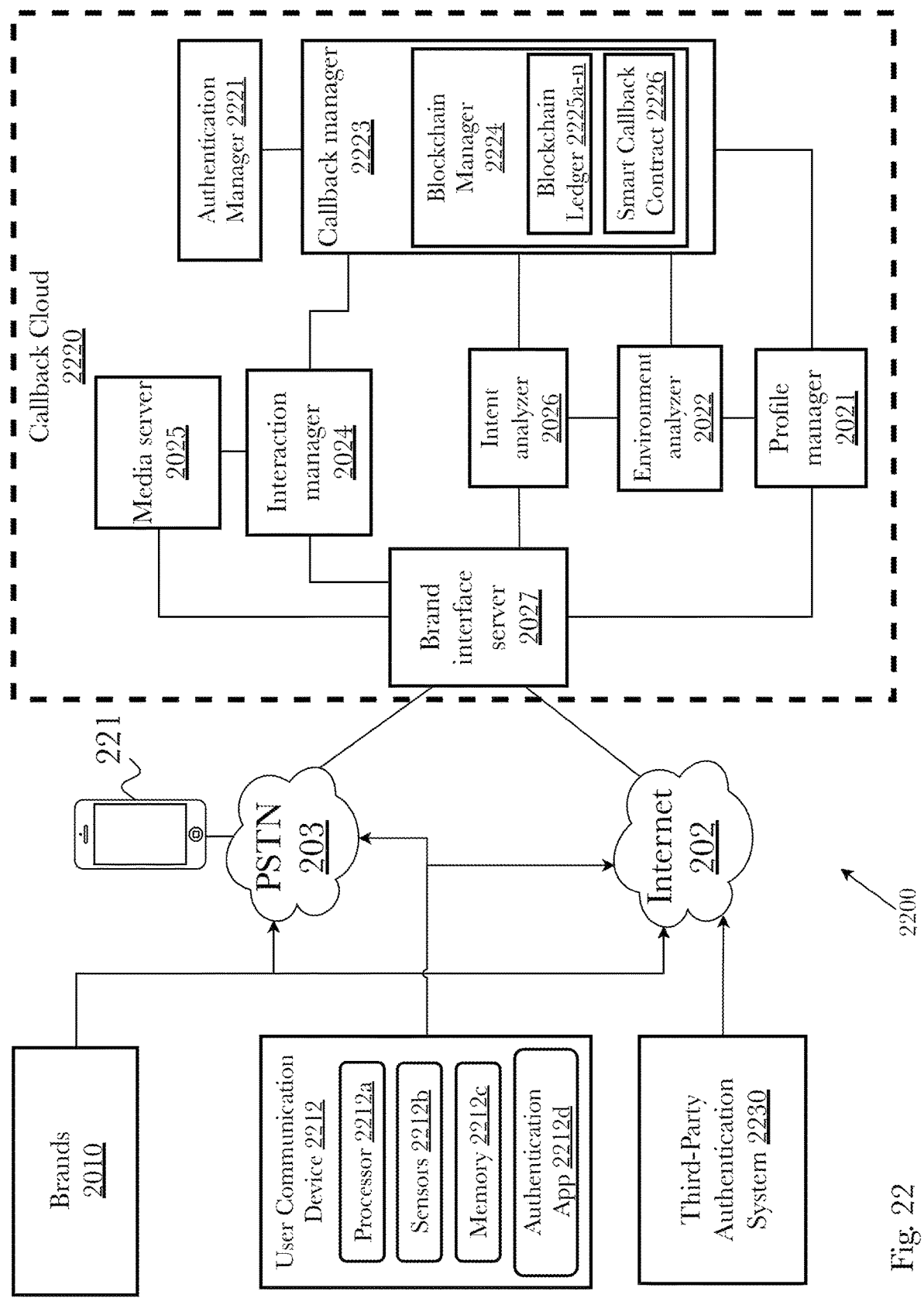
FIG. 22 is a block diagram illustrating an exemplary system architecture for user, device, and transaction authentication using smart contracts, according to an embodiment.

FIG. 22 is a block diagram illustrating an exemplary system architecture 2200 for user, device, and transaction authentication using smart contracts, according to an embodiment. System 2200 may be used to negotiate a session establishment and broker communications between and among users such that system users can quickly and efficiently have their needs met. In this diagram (referring to FIG. 22) an exemplary system 2000 arrangement is shown as a callback cloud 2020 operating over a public switched telephone network and the Internet, and connecting to a variety of other brand devices and services, according to an embodiment. A collection of brands 2010 may be present either singly or in some combination, possibly including (referring now to FIG. 20) a Public Branch Exchange ("PBX") 2011, a Session Initiation Protocol ("SIP") server 2012, a Customer Relationship Management ("CRM") server 2013, a call router 2014, or a chat server 2015, or some combination of these brands. These brands 2010 (now referring to FIG. 22) may communicate over a combination of, or only one of, a Public Switched Telephone Network ("PSTN") 203, and the Internet 202, to communicate with other devices including a callback cloud 2220, a company phone 221, or a personal user communication device 2212. A SIP server is responsible for initiating, maintaining, and terminating sessions of voice, video, and text or other messaging protocols, services, and applications, including handling of PBX phone sessions, CRM server user sessions, and calls forwarded via a call router, all of which may be used by a business to facilitate diverse communications requests from a user or users, reachable by phone 221, 2212 over either PSTN 203 or the Internet 202. A chat server may be responsible for maintaining one or both of text messaging with a user, and automated voice systems involving technologies such as an Automated Call Distributor ("ACD"), forwarding relevant data to a call router and CRM server for further processing, and a SIP server for generating communications sessions not run over the PSTN 203. Various systems may also be used to monitor their respective interactions (for example, chat session by a chat server or phone calls by an ACD or SIP server), to track agent and resource availability for producing EWT estimations.

When a user calls from a mobile device 2212 or uses some communication application such as (for example, including but not limited to) SKYPE™ or instant messaging, which may also be available on a laptop or other network endpoint other than a cellular phone 2212, they may be forwarded by brand interface server 2027 to brands 2010 operated by a business in the manner described herein. For example, a cellular phone call may be placed over PSTN 203 and received by brand interface server 2027 before being handled by a call router and generating a session with a SIP server, the SIP server creating a session with a callback cloud 2220 with a profile manager 2021 if the call cannot be completed, resulting in a callback being required. A brand interface server 2027 in a callback cloud 2020 receives initial requests to connect to callback cloud 2020 and instructs profile manager 2021 to forward relevant user profile information to a callback manager 2023, which may further request environmental context data from an environment analyzer 2022. Environmental context data may include (for example, and not limited to) recorded information about when a callback requester or callback recipient may be suspected to be driving or commuting from work, for example, and may be parsed from online profiles or online textual data, using an environment analyzer 2022.

A callback manager 2223 centrally manages all callback data, creating a smart callback contract 2226 which may be used to execute a workflow and manage the data for a particular callback, and communicates with an interaction manager 2024 which handles requests to make calls and bridge calls, which go out to a media server 2025 which actually makes the calls as requested. In this way, the media server 2025 may be altered in the manner in which it makes and bridges calls when directed, but the callback manager 2023 does not need to adjust itself, due to going through an intermediary component, the interaction manager 2024, as an interface between the two. A media server 2025, when directed, may place calls and send messages, emails, or connect voice over IP ("VoIP") calls and video calls, to users over a PSTN 203 or the Internet 202.

Present in this embodiment is a brand interface server 2027, which may expose the identity of, and any relevant API's or functionality for, any of a plurality of connected brands 2010, to elements in a callback cloud 2220. In this way, elements of a callback cloud 2220 may be able to connect to, and interact more directly with, systems and applications operating in a business' infrastructure such as a SIP server, which may be interfaced with a profile manager 2021 to determine the exact nature of a user's profiles, sessions, and interactions in the system for added precision regarding their possible availability and most importantly, their identity. Also present in this embodiment is an intent analyzer 2026, which analyzes spoken words or typed messages from a user that initiated the callback request, to determine their intent for a callback. For example, their intent may be to have an hour-long meeting, which may factor into the decision by a callback cloud 2220 to place a call shortly before one or both users may be required to start commuting to or from their workplace. Intent analysis may utilize any combination of text analytics, speech-to-text transcription, audio analysis, facial recognition, expression analysis, posture analysis, or other analysis techniques, and the particular technique or combination of techniques may vary according to such factors as the device type or interaction type (for example, speech-to-text may be used for a voice-only call, while face/expression/posture analysis may be appropriate for a video call), or according to preconfigured settings (that may be global, enterprise-specific, user-specific, device-specific, or any other defined scope).

According to an embodiment, callback manager 2223 may utilize and orchestrate blockchain technology via a blockchain manager 2224 to improve end user experience, satisfaction, and security when interacting with an enterprise 220 such as a contact center. According to some embodiments, the blockchain manager 2024 may be implement a blockchain as a private blockchain. Operating a private blockchain, callback cloud 2220 is able to read and write data contained within the private blockchain in order to create and manage smart callback contracts 2226. Smart callback contracts 2226 may be implemented using smart contract technology. Smart contracts work by following simple "if/when . . . then . . . " statements that are written into code on a blockchain. A network of computers (e.g., callback cloud 2220) executes the actions when predetermined conditions have been met and verified. These actions could include, but are not limited to, releasing funds to the appropriate parties, applying a change of service, updating a user profile, executing a scheduled callback between the appropriate parties, sending notifications, and routing requests. The blockchain is then updated when the transaction is completed. That means the transaction cannot be changed, and only parties who have been granted permission (i.e., authorized users/parties) can see the results.

Callback cloud 2220 may utilize a root smart callback contract 2226 template that can be configured to execute a callback using information specific to a given callback request. The root template may be comprised of a plurality of default fields which may be populated with user or enterprise-specific information during smart callback contract creation. For example, in one embodiment, default fields may include, but are not limited to, participating parties' identities (e.g., callback requestor and a callback recipient), participants contact information (e.g., phone number, extension number, email address, social media handle, etc.), communication device(s), method of communication (e.g., phone call, email, SMS message, VoIP call, etc.), scheduled callback time, brand information (e.g., from brand interface server 2027), context data (e.g., environmental and intent context, historical user profile data, past interactions, links to previous smart callback contracts, etc.). Furthermore, smart callback contract 2226 may be configured to store historical user identifier and behavior data in order to support user, device, and transaction authentication and validation capabilities. In some implementations, user identifier and behavior information may be stored on a blockchain and maintained in a blockchain ledger 2225*a-n*. In such implementations, the information may be stored as a single hash value or one or more hash values that represent either a single piece or information or a group of two or more pieces of information. By utilizing a root template, callback cloud 2220 can efficiently and dynamically create extensible smart callback contracts 2226 for both simple and complex callback use cases.

According to an embodiment, the root contract template may comprise pre-coded logic and/or computer readable instructions which may perform a variety of actions, such as executing a callback via a smart callback contract 2226. The pre-coded logic and/or computer readable instructions may be completed when one or more default data fields are populated with information. What this means is that the behavior of the smart contract 2226 created using the root template is at least partially determined based off the values input into the default fields. For example, a root smart callback contract 2226 template has pre-coded logic to execute when a certain trigger occurs, the trigger being a specified time, and wherein the time value to be used within the pre-coded trigger event logic is the scheduled callback time that was input into the corresponding default field during smart callback contract 2226 construction. As another example, the root smart callback contract 2226 template has pre-coded logic to connect two parties via method of communication, wherein the method of communication default field value determines the underlying logic used to connect two parties, such as method of communication being email which would have different connecting logic than a method of communication being a phone call. In this way, system 2200 can use a root contract template from which to create a broad range of smart contracts in order to negotiate session establishment between and among a plurality of individual users, enterprises and their systems, and brands.

According to an embodiment, the callback cloud 2220 can be or may include any servers that can be used to keep a digital ledger 2225*a-n*. A digital ledger is where multiple copies of the same blockchain(s) are stored on separate servers in order to validate a transaction (e.g., execution of a callback). The digital ledger typically has copies of a single blockchain 2028 that is used for all transactions (for multiple users of the contact center) in a contact center or other enterprise 220. This allows verification if one blockchain becomes compromised or corrupted. In some implementations, the blockchain ledger 2225*a-n* is part of a distributed ledger. The distributed ledger can be used to restore a blockchain ledger 2225*a-n* if the device that has the ledger fails. When a new transaction occurs in the callback cloud 2220, if the transaction is validated, a new block is added to the blockchains on each of the servers to keep a record of the transaction. In one embodiment there may be a separate blockchain associated with each user and stored as part of a user profile.

Callback manager 2223 may receive, retrieve, or otherwise obtain and work with a user's profile as managed by a profile manager 2021, with environmental context from an environment analyzer 2022, with intent as determined from intent analyzer 2026 as well as (if provided) EWT information for any callback recipients (for example, contact center agents with the appropriate skills to address the callback requestor's needs, or online tech support agents to respond to chat requests), to determine an appropriate callback time for the two users (a callback requestor and a callback recipient), interfacing with an interaction manager 2024 to physically place and bridge the calls with a media server 2025. When a callback is requested by a system user, callback manager 2223 may populate the fields of a smart callback contract 2226 with the obtained user profile information, the environmental and intent context, historical user identifier and behavior data, a list of validated user communication devices, and a scheduled callback time based on EWT information (if provided). Smart callback contracts 2226 may be triggered to connect a callback requestor with a callback recipient when the scheduled callback time occurs. When the scheduled callback time occurs the code (i.e., machine readable instructions) within the smart callback contract 2226 may cause interaction manager 2024 to bridge the callback request and then connect the two parties using media server 2025. After the parties have been connected, the smart callback contract may then be validated and added to the blockchain digital ledger by callback manager 2223 via blockchain manager 2224. In this way, a user may communicate via the callback cloud 2220 with another user on a PBX system, or with automated services hosted on a chat server, and if they do not successfully place their call or need to be called back by a system, a callback cloud 2220 may find an optimal time to bridge a call between the callback requestor and callback recipient, as necessary.

User communication device 2212 may be any suitable computing device capable of communicating via communication network such as the Internet 202 or a PSTN 203 and may comprise such devices as smart phones, PDAs, tablets, smart wearables, and/or the like. According to the embodiment, user communication device 2212 comprises at least a processor 2212a, a plurality of sensors 2212b, a memory 2212c, and plurality of applications including an authentication application 2212d. User communication device 2212 may further comprise an operating system, input/output components, a display screen, a microphone, and a camera, and various other components generally found on such communication devices known to those skilled in the art. The authentication app 2212d can be or may include any software/firmware that can authenticate a user. The authentication app 2212d may work in conjunction with third party authentication systems 2230 and/or authentication manager 2221. The authentication app 2212d may receive information such as, but not limited to, a user name, a password, a digital certificate, one or more biometrics, and/or the like. The authentication app 2212d may be a web application provided by a web server.

In various implementations, authentication app 2212d may be configured to monitor a user interaction with the user communication device 2212 and collect various types of data related to user and device identifiers and behavior. Authentication app 2212d may monitor and/or determine various device usage characteristics, such as the non-limiting, a preferred hand of a user (i.e., the user is left handed), a number of fingers used by the user in typing (e.g., on a smart phone or tablet), an average key pressure, an average key pressure range, a location of the user communication device, a language setting, a WiFi access point used by the user communication device 2212d, an average number of emojis used by the user, an amount of spelling errors made over time, a cadence between keystrokes, and an application usage parameter to name a few. This type of information may be obtained and used to determine user identifier behavior data that can be used to authenticate and validate a user, a user device, and/or a transaction between a user and at least one other party. This collected data may be sent to blockchain manager 2224 which, in some implementations, stores the collected user identifier and behavior data as historical user identifier and behavior data in a blockchain as hashed values. This stored historical user data may be retrieved or otherwise obtained by callback manager 2223 when a new smart callback contract 2226 is being created and defined such that the historical user identifier and behavior data is stored in a default data field in the smart callback contract 2226. Furthermore, during user, device, and/or transaction authentication processes, user communication device 2212 may be queried to send current user identifier and behavior data (based at least in part on monitored device usage characteristics) to an authentication manager 2221, wherein the current user data may be used to provide authentication of a user, device, and/or transaction.

According to the embodiment, an authentication manager 2221 is present and configured to enhance the core callback capabilities of callback cloud 2220 by providing authentication and authorization mechanisms for an individual user, a device, and/or a transaction utilizing blockchain technology and smart contracts. Aspects of authentication manager 2221 may take the form of an entirely hardware embodiment, an entirely software embodiment (including firmware, resident software, microcode, etc.), or an embodiment combining software and hardware aspects that may all generally be referred to herein as "circuit", "module" or "system." For example, authentication manager 2221 may comprise a plurality of machine readable and executable instructions stored in a the memory of a computing device and executed by at least one processor of the computing device. In some implementations, the plurality of machine readable instructions and the execution thereof may be stored in and performed by one or more computing devices such as, for example, in a local- or wide-area network (either wire or wireless connected) or a cloud-based distributed computer network.

According to the embodiment, authentication manager 2221 is configured to validate the one or more parties associated with a smart callback contract prior to execution of the smart contract. For example, if the smart contract is for a callback and it specifies a time to perform the callback, a mode of communication (e.g., phone call, email, text message, Internet voice call, video call, instant messaging application, etc.), and a caller and callback recipient, then authentication manager 2221 would attempt to validate the caller and callback recipient prior to the specified callback time. In various implementations, in operation authentication manager 2221 may receive, retrieve, or otherwise obtain a smart callback contract, such as, from callback manager 2223. Furthermore, authentication manager 2221 may receive, retrieve, or otherwise obtain current user identifier and behavior data from a user communication device 2212. Authentication manager 2221 may then provide user, device, and transaction authentication by comparing the current user identifier and behavior data with historical user identifier and behavior data stored in the smart callback contract 2226 in order to identify one or more matches between the two sets of information (i.e., the current and historical data).

Authentication manager 2221 can authenticate a user and/or user communication device in various ways, such as by using a user name/password, by using one or more biometrics, by using device usage characteristics, and/or the like. In some embodiments, authentication manager 2221 supports the authentication and authorization of individual users by comparing new user identifiers or user behavior against historical values stored in a blockchain. In some implementations, user identifiers and user behavior may be based on user device usage characteristics. The device usage characteristics can be or may include any characteristics that are based on a user interaction with a user communication device as well as any interactions between contact center and a user (e.g., customer). For example, historical user interactions with a contact center (or a callback cloud platform) such as previous communication sessions with contact center agents, may be used to compute, derive, identify, or infer device usage characteristics. The device characteristics can be or may include how a user interacts with various elements (e.g., input/output) in a user communication device, such as, a camera, a microphone, a touchscreen, a keyboard, a virtual keyboard, a button, a menu, an area of a display, a window, an accelerometer, a heart rate sensor, a sensor, and/or the like.

User identifiers and behaviors may be determined based on device usage characteristics and data. Device usage characteristic may include various types of device usage characteristics, such as, a preferred user hand of the user, a number of fingers used by the user in typing, an average key pressure, a location, a language setting, a WiFi access point, an install date of an authentication application, an install date of one or more applications, an application usage parameter, a cadence between keystrokes, an amount of spelling errors, types of emoji used, an average number of emojis used, a swipe text usage, local region settings, a sim card identifier, a user location pattern (e.g., where the user is likely at a location during a time period), web site interaction time, a device angle, a device height from the ground, a connection to a smart wearable (e.g., watch, glasses, armband, health monitor, etc.), a time period of movement of the user communication device, and/or the like. In addition, device usage characteristics may be a hashed device usage characteristic, an encrypted device usage characteristic, and/or the like.

The authorization of users (e.g., customers) is autonomous and transparent to users, wherein a user is not called (referring to smart callback contracts) unless he or her has been authenticated in the background discretely. For example, in some implementations there are no prompts or warnings asking for user authentication that might leak information about a smart contract, such as, the one or more parties associated with the smart contract and the information/data contained within the smart contract. This also has the benefit of preventing risks from physical access to a device associated with a smart contract because user authorization is tied to user-specific identifiers and behavior determined in part by a plurality of device usage characteristics.

Authentication manager 2221 is also configured to provide for device authentication in addition to the provided user authentication capabilities. As stated above, device usage characteristics can be identified, learned, derived, and inferred in order to determine and track user/device identifiers and behavior. This provides an added layer of security, especially in the event that a user's communication device is stolen. For example, a user communication device may first be identified based on physical characteristics or parameters associated with the device such as, for example, a smart phone's International Mobile Equipment Identity (IMEI) number which identifies the correct device, but then device behavior may be compared against stored historical values in a blockchain to validate that the correct user is in control of the communication device and not a malicious actor. In this example, a behavior mismatch prevents an unauthorized party from participating in the smart contract despite being in possession of an authorized user device. A similar process can be leveraged in the event that a user changes devices. In this case, a device identifier may mismatch with stored device identifier information, but device behavior can be weighted to overcome it. For example, if a device identifier does not match stored device identifiers associated with a user, but the new device behavior data obtained from the new device closely matches stored historical values of user device behavior, then authorization manager 2221 can be configured to authenticate the device absent a matching unique, physical device identifier. Additionally, or alternatively, the system can use a failsafe "please verify yourself" manual option to validate an existing user with a new device. In such a scenario, callback cloud 2220 may request that the user provide personally identifiable information that would further identify/authenticate the user.

In some embodiments, authentication manager 2221 is additionally configured to provide for the authorization and validation of a transaction. In some implementations, authentication manager 2221 can validate a transaction against the terms of a smart contract 2226. For example, if a smart contract is created to provide a callback between a customer and a contact center via video call, wherein the video call is only allowed to happen when a customer is on a device associated to a specific IP address (e.g., the IP address of a customer's home, work office, etc.), and if the customer is not accessing the Internet for the video call through the specified IP address as determined by authentication manager 2221, then the transaction (i.e., callback) would not be authenticated, or even be implemented.

In some embodiments, authentication manager 2221 may be configured to provide transaction authorization in the event that a user device is offline or otherwise unavailable, thus preventing the execution of a smart callback contract. For example, both/all of the parties specified in a smart contract may be reachable, but one of the devices involved is the smart contract is not. In some implementations, authentication manager 2221 can support out-of-band (OOB) transaction verification to validate transactions via third party authentication systems 2230. In this implementation, a smart callback contract 2226 can have parameters (e.g., default data fields) that define acceptable third-party devices for validation if needed, in case a user's device is unavailable. Third-party devices can be defined in various ways, such as, by service provider. For example, if a user/party of a smart contract has multiple devices (e.g., a personal cell phone and work-provided cell phone, a smart phone and a tablet, etc.) which have the same service provider (e.g., cell phone service provider), then the smart contract can define to use any devices associated with the user from a given service provider. Alternatively, a smart contract can use service providers to define which alternate devices not to use in the event a primary user device is offline or otherwise unavailable. Another possible solution that authentication manager 2226 can provide in the event that a user device is offline takes place during smart contract creation and configuration in the form of providing and validating multiple devices associated with a user and/or party of the smart contract. In this way, in the event that one of the multiple devices is offline or otherwise unavailable at the time of smart contract execution, an alternate device operated by the party with the offline device can be used to authenticate a transaction, a user, and/or a device of an user.

A third party authentication system 2230 can be or may include any system that can authenticate a user on behalf of another party. The third party authentication system 2230 may be used to authenticate a user using a username/password, a digital certificate, one or more biometrics, and/or the like on behalf of the callback cloud 2220 and/or brand 2010 (e.g., a contact center).

Figure 23:
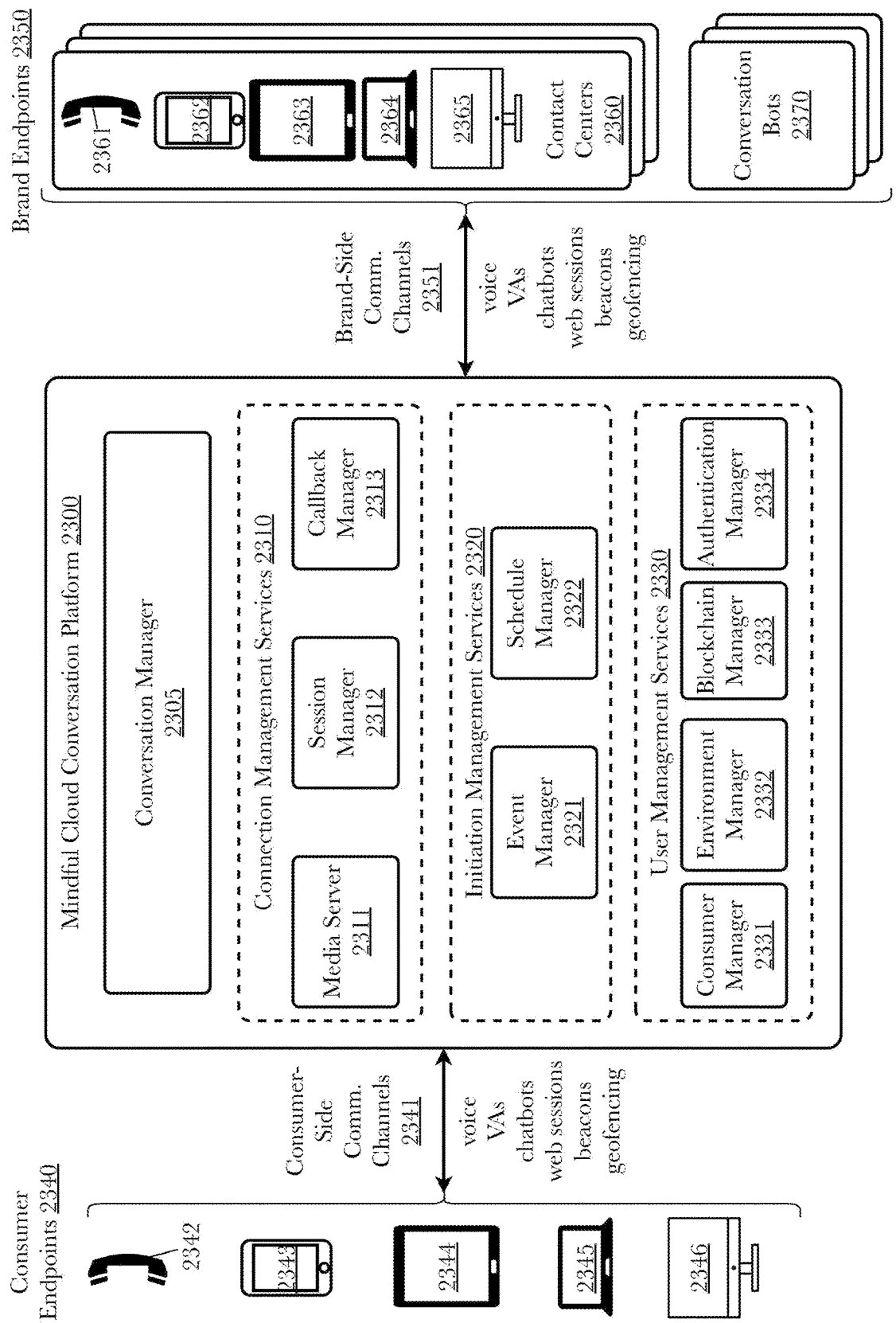
FIG. 23 is a block diagram illustrating another exemplary system architecture embodiment for user, device, and transaction authentication using smart contracts utilizing a mindful cloud conversation platform.

FIG. 23 is a block diagram illustrating another exemplary system architecture embodiment for user, device, and transaction authentication using smart contracts utilizing a mindful cloud conversation platform. The mindful cloud conversation platform (MCCP) 2300 is designed to provide automated, machine-learning-algorithm-supported complex conversation support to brands to establish, enhance, and maintain relationships with their consumers. Its capabilities exceed those of traditional callback systems or customer relationship management systems in that it is designed not just to keep records of past interactions between a given brand and a given consumer and schedule callbacks from the brand to the consumer, but to manage the entirety of complex conversations that may occur between consumers and brands, including conversations involving multiple consumers and multiple brands.

The mindful cloud conversation platform 2300, therefore, manages complex conversations, possibly over an extended period of time, between one or more brand endpoints 2350 of a brand and one or more consumer endpoints 2340 of a consumer or consumers. The consumer endpoints 2340 may be any device used by a consumer for communications including, but not limited to plain old telephone service (POTS) 2342, mobile phones or smartphones 2343 (e.g., user communication device 2212), tablet computers 2344, laptop computers 2345, and desktop computers 2346. While not shown here, in-person communications (without devices) is also considered to be a consumer endpoint 2340 (e.g., in some cases, the mindful cloud conversation platform 2300 may recommend in-person communications for certain sessions). Consumer-side communication channels 2341 between the consumer endpoints 2340 and the mindful cloud conversation platform 2300 may be established or triggered through any means supported by the consumer endpoints 2340 including, but not limited to, voice, virtual assistants (VAs), chatbots, web sessions, electronic beacons placed in physical locations such as store displays, and geofenced triggers.

The brand endpoints 2340 may be any device used by a consumer for communications including, but not limited to plain old telephone service (POTS) 2361, mobile phones or smartphones 2362, tablet computers 2363, laptop computers 2364, and desktop computers 2365. While not shown here, in-person communications (without devices) is also considered to be a brand endpoint 2340 (e.g., in some cases, the mindful cloud conversation platform 2300 may receive data from an in-person purchase at a brand-owned store). In this embodiment, the brand endpoints 2350 are located at a contact center 2360 which handles consumer relations for the brand, either as a brand-owned contact center or a third party contact center service. Further, the brand endpoints in some cases may be conversation bots 2370 (also known as chatbots or interactive voice response (IVR) systems) instead of human agents. Brand-side communication channels 2351 between the brand endpoints 2350 and the mindful cloud conversation platform 2300 may be established or triggered through any means supported by the brand endpoints 2350 including, but not limited to, voice, virtual assistants (VAs), chatbots, web sessions, electronic beacons placed in physical locations such as store displays, and geofenced triggers.

In this embodiment, the system can be conceived of as comprising a conversation manager 2305, a connection management services layer 2310, an initiation management services layer 2320, and a user management services layer 2330. However, certain components within each of these layers may perform some aspects of other layers, so there can be cross-over between layers in some cases. Further, in other embodiments, the functionalities of certain components described herein may be performed by other components, depending on platform configuration.

Conversation manager 2305 is the component that determines the scope of each conversation and manages overall communications between the components at each layer accordingly, although data may still be passed directly from component to component. Connection management services layer 2310 generally determines what communications should be established and how they should be established (often referred to herein as a "mode" of communications). The connection management services layer 2310 comprises a media server 2311 which establishes communications between consumer endpoints 2340 and brand endpoints 2350 and performs any necessary media translations (e.g., automated speech recognition, text to speech, etc.), a session manager 2312 which assigns session identifiers, instructs the media server 2311 to establish connections, and handles all incoming, outgoing, and stored data associated with each session, and a callback manager 2313 (which may be a specific implementation of callback manager 2223) which executes callbacks initiated by the initiation management services layer 2320 by instructing the session manager 2312 to initiate a callback.

Initiation management services layer 2320 determines when communications should be established. Initiation management services layer 2320 comprises an event manager 2321 which initiates callbacks based on events occurring outside of a session, and a schedule manager 2322 which determines when communications should be established and schedules callbacks based on the determinations. Callbacks initiated by the event manager 2321 and schedule manager 2322 are passed up to the connection management service layer 2310 and executed by the callback manager 2313.

User management services layer 2330 stores information about consumers and brands for determination of when and how communications should be established, provides blockchains for the storage of certain consumer (e.g., users) and brand information as well as to execute callback workflows via smart callback contracts, and provides user, device, and transaction authentication mechanisms to support platform functions and capabilities. User management services layer 2330 comprises a consumer manager 2331 which manages the profiles of consumers for use in establishing effective conversations with them, an environment manager 2332 which stores information about brands including operations information and analysis, locations and status of communications infrastructure, and customer relationship management (CRM) information, a blockchain manager 2333 which can manage blockchain(s) either individually and/or in a distributed ledger, an authentication manager 2334 which enhances the core callback capabilities of MCCP 2300 by providing authentication and authorization mechanisms for an individual user, a device, and/or a transaction utilizing blockchain technology and smart contracts, plus and event thrower which can trigger scheduling of callbacks by sending instructions up to initiation management services layer 2320 for event rule establishment by the event manager 2321 or scheduling by the schedule manager 2322. In operation, blockchain manager 2333, authentication manager 2334, and callback manager 2313 are configured to operate and function similarly as the components of the same name described above with reference to FIG. 22.

Certain of these services have machine learning algorithms incorporated into them trained to perform analyses of the particular type of operation handled by that service. The outputs of each service can be used as inputs to other services, such that a network of machine learnings algorithms is created which, when operated together, determines when and how to establish ongoing communications with consumers so as to maximize the relationship between the consumer and a given brand.

Figure 24:
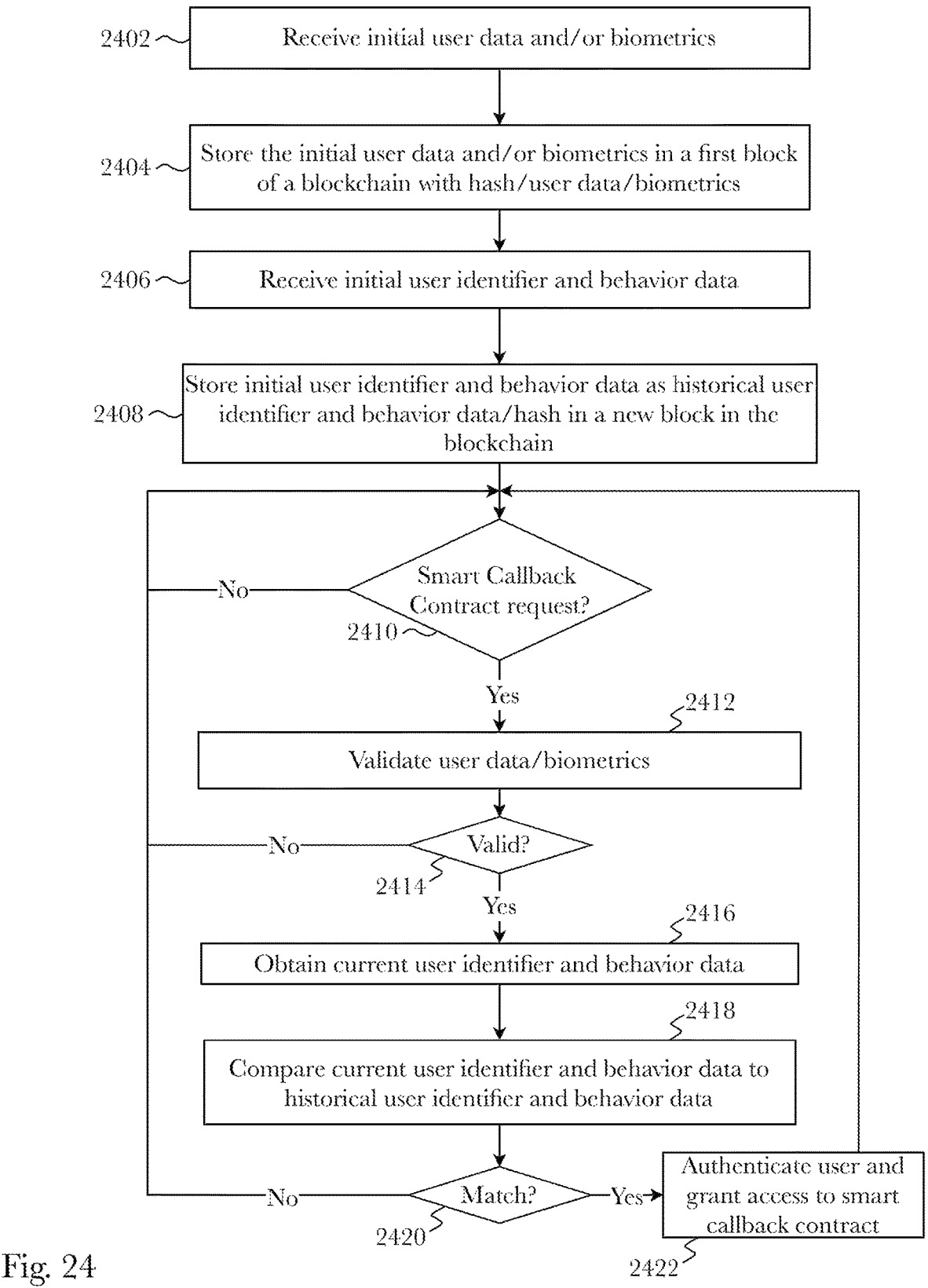
FIG. 24 is a flow diagram illustrating an exemplary method for providing user, device, and transaction authentication and validation, according to an aspect.

FIG. 24 is a flow diagram illustrating an exemplary method for providing user, device, and transaction authentication and validation, according to an aspect. Illustratively, the user communication devices 2212, the callback manager, 2223, 2313, the blockchain manager 2224, 2333, the authentication manager 2221, 2334, and the third party authentication system 2230 are stored-program-controlled entities, such as a computer or microprocessor, which performs the method of FIG. 24 and the processes described herein by executing program instructions stored in a computer readable storage medium, such as a memory (i.e., computer memory, a hard disk, and/or the like). Although the method described in FIG. 24 is shown in a specific order, one of skill in the art would recognize that the steps in FIG. 24 may be implemented in different orders and/or be implemented in a multi-threaded environment. Moreover, various steps may be omitted or added based on the implementation.

The process starts in step 2402. Authentication manager 2221 and/or third party authentication system 2230 receives the user data/biometrics in step 2402. For example, the third party authentication system 2230 may verify the user, user data (e.g., name, address, device identification number, etc.) and get biometrics (e.g., facial, fingerprint, retinal scan, voice print, etc.). Alternatively, the authentication app 2212d may receive the user data/biometrics. In some embodiments, the user data/biometrics are sent to authentication manager 2221. A blockchain is optionally created in step 2404, with the first block in the blockchain being populated with the user data/biometrics. For example, blockchain manager 2224 creates the blockchain in the blockchain ledger 2225a-n. The blockchain may then be copied to blockchain ledger 2225a-n as part of a distributed blockchain ledger. This step is considered optional because user data/biometrics may alternatively be stored in a user profile stored in a non-transitory storage device without affecting the functionality of the system, but only decreasing the security of the data as an encrypted blockchain provides better data security mechanisms. The blockchain manager 2224 may wait, in step 2406, to receive the initial user identifier and behavior data from the authentication app 2212d operating on the user's communication device 2212. Once received, the initial user identifier and behavior data may be stored as historical user identifier and behavior data/has in a new block in the blockchain in step 2408. Blockchain manager 2224 may receive the initial user identifier and behavior data and store in it in a second block in the blockchain and linked to the first block which contains user data/biometrics/hash.

At step 2410, authentication manager 2221 waits to receive a smart callback contract. A smart callback contract may comprise a plurality of default data fields that may be populated with various types of information, such as, two or more parties associated with a callback, historical user identifier and behavior data, a scheduled callback time, and/or the like. If no smart callback contract is received or requested, then the process waits at step 2410. Otherwise, if a smart callback contract is received, then one or more of authentication manager 2221, third-party authentication system 2230, and authentication app 2221 may validate the user data (e.g., a user name/password) and the biometrics in step 2412. If user data/biometrics are not valid at step 2414, the process goes back to step 2410. Otherwise, if the user data/biometrics are valid in step 2414, authentication manager 2221 obtains the current user identifier and behavior data in step 2416. One or more of authentication manager 2221 and blockchain manager 2224 compares the current user identifier and behavior data or compares a hash of the current identifier and behavior data of the blockchain to the historical user identifier and behavior data at step 248. Alternatively, or additionally, at step 2418 the current user identifier and behavior data is compared to historical user identifier and behavior data stored in the smart callback contract.

If there is not a match in step 2420, then the process waits at step 2410. Otherwise, if a match is found if there is a match in step 2420, then authentication manager 2221 can authenticate and validate a user and grant the user access to the smart callback contract in step 2422. At this point the authentication manager 2221 may wait at step 2410 for another smart callback contact to be received. In some implementations, steps 2412-2422 may be performed prior to the scheduled callback time. In some implementations, authentication manager 2221 may send user authorization to access the smart contract to callback manager 2224, which may then perform the following steps of: executing the smart callback contract between consumers and agents at a specified time; connecting the two parties, when the two first and second called parties are online; and validating the smart callback contract and add the callback to the blockchain ledger.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit ("ASIC"), or on a network interface card.

Software/hardware hybrid implementations of at least some of the aspects disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific aspects, at least some of the features or functionalities of the various aspects disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some aspects, at least some of the features or functionalities of the various aspects disclosed herein may be implemented in one or more virtualized computing environments (e.g., network computing clouds, virtual machines hosted on one or more physical computing machines, or other appropriate virtual environments).

Figure 25:
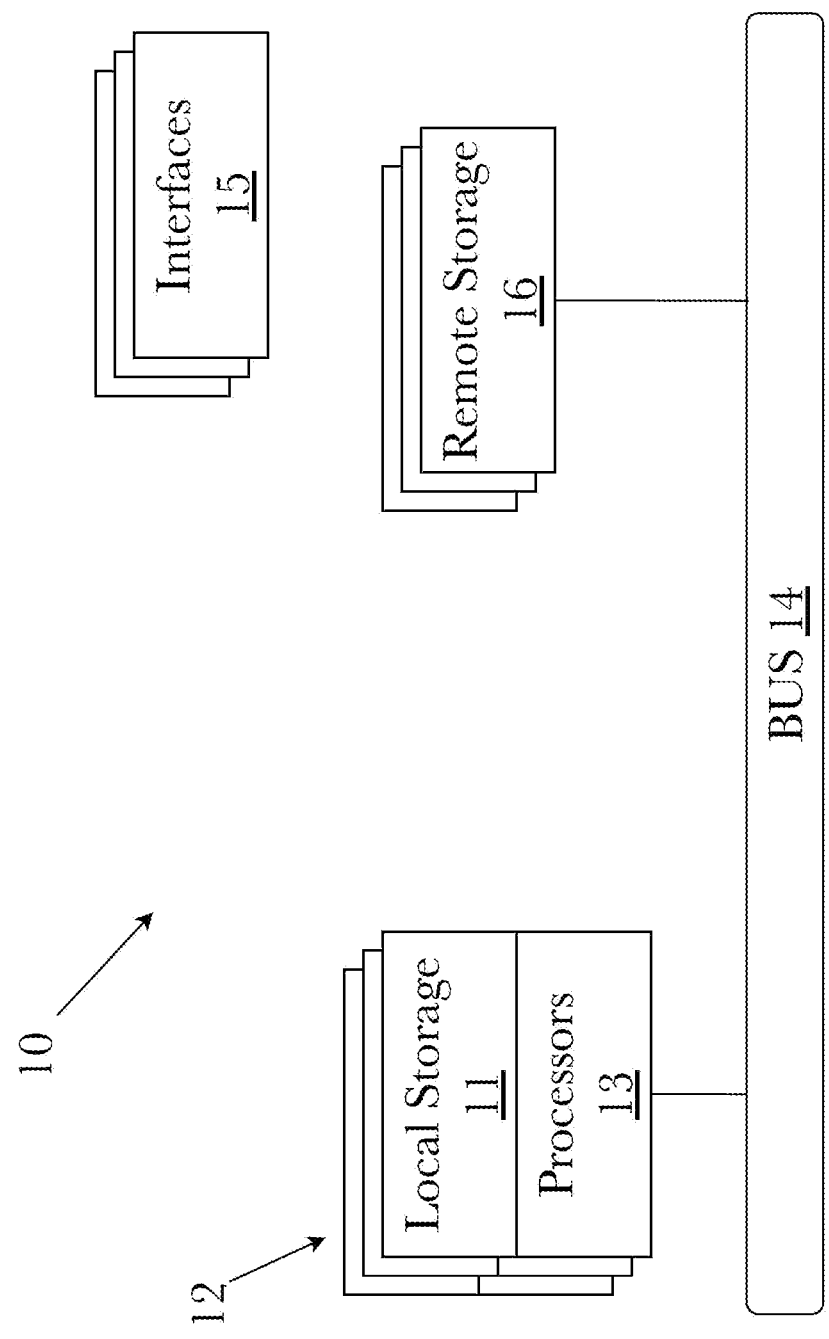
FIG. 25 is a block diagram illustrating an exemplary hardware architecture of a computing device.

Referring now to FIG. 25, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one embodiment, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one embodiment, a computing device 10 may be configured or designed to function as a server system utilizing CPU 12, local memory 11 and/or remote memory 16, and interface(s) 15. In at least one embodiment, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some embodiments, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a specific embodiment, a local memory 11 (such as non-volatile random access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (Wi-Fi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 25 illustrates one specific architecture for a computing device 10 for implementing one or more of the inventions described herein, it is by no means the only device architecture on which at least a portion of the features and techniques described herein may be implemented. For example, architectures having one or any number of processors 13 may be used, and such processors 13 may be present in a single device or distributed among any number of devices. In one embodiment, a single processor 13 handles communications as well as routing computations, while in other embodiments a separate dedicated communications processor may be provided. In various embodiments, different types of features or functionalities may be implemented in a system according to the invention that includes a client device (such as a tablet device or smartphone running client software) and server systems (such as a server system described in more detail below).

Regardless of network device configuration, the system of the present invention may employ one or more memories or memory modules (such as, for example, remote memory block 16 and local memory 11) configured to store data, program instructions for the general-purpose network operations, or other information relating to the functionality of the embodiments described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 26:
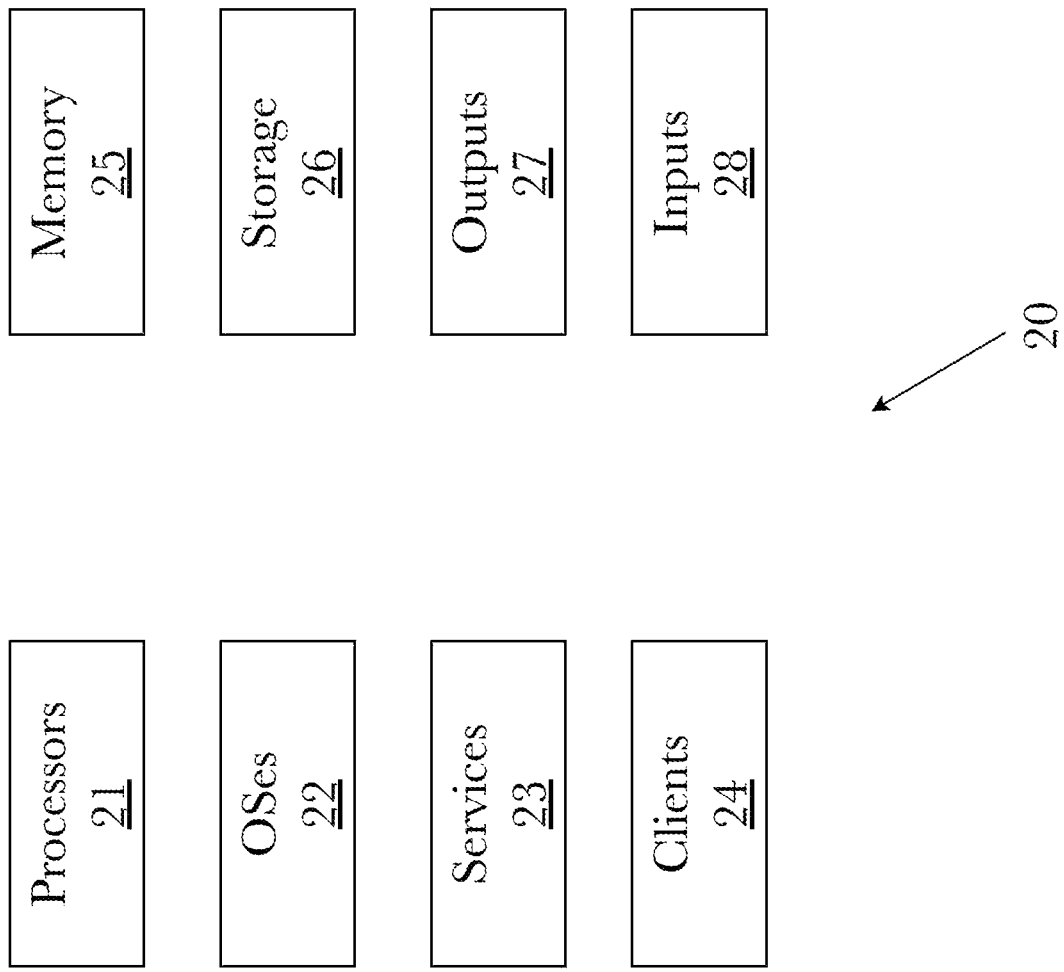
FIG. 26 is a block diagram illustrating an exemplary logical architecture for a client device.

In some embodiments, systems according to the present invention may be implemented on a standalone computing system. Referring now to FIG. 26, there is shown a block diagram depicting a typical exemplary architecture of one or more embodiments or components thereof on a standalone computing system. Computing device 20 includes processors 21 that may run software that carry out one or more functions or applications of embodiments of the invention, such as for example a client application 24. Processors 21 may carry out computing instructions under control of an operating system 22 such as, for example, a version of MICROSOFT WINDOWS™ operating system, APPLE OSX™ or iOS™ operating systems, some variety of the Linux operating system, ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 25). Examples of storage devices 26 include flash memory, magnetic hard drive, CD-ROM, and/or the like.

Figure 27:
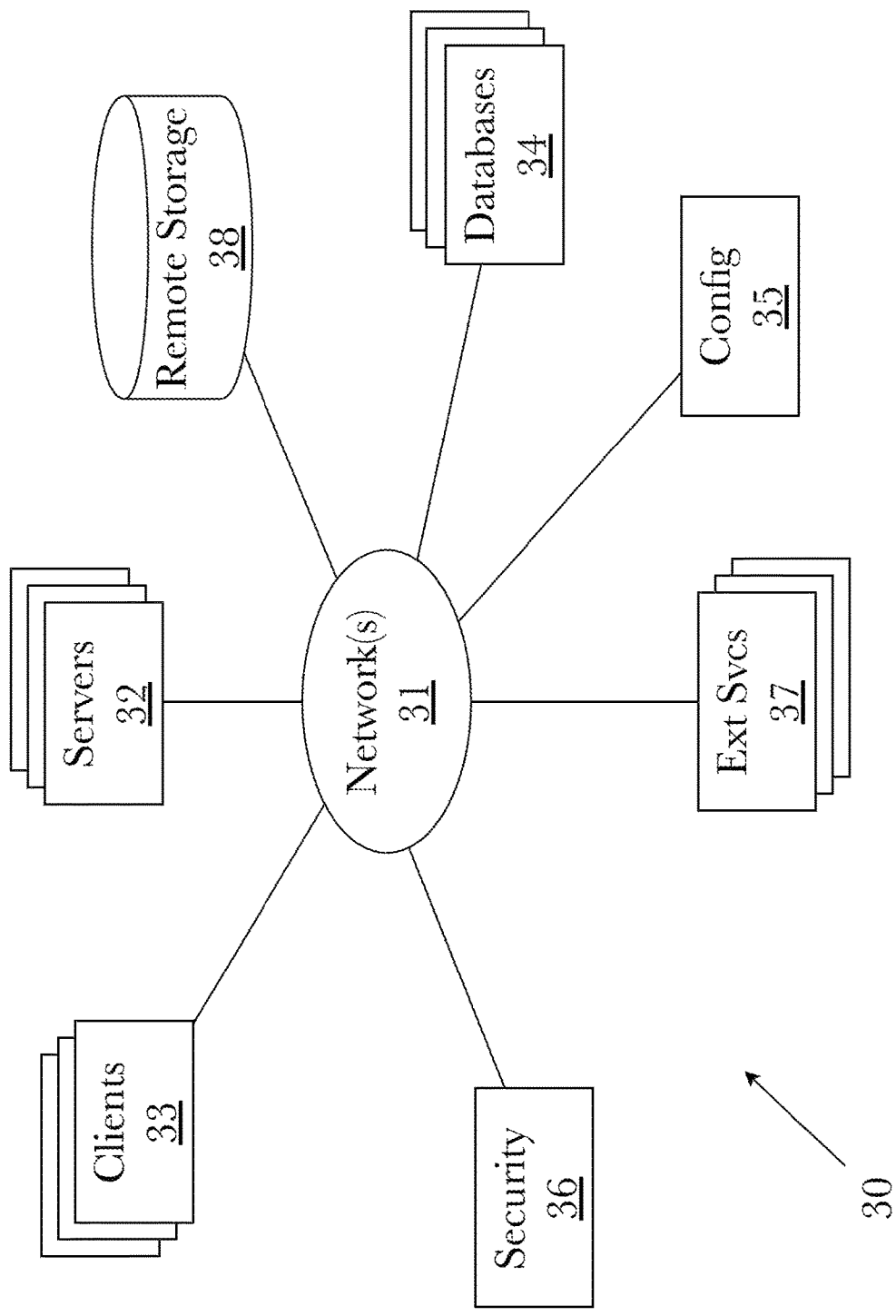
FIG. 27 is a block diagram showing an exemplary architectural arrangement of clients, servers, and external services.

In some aspects, systems may be implemented on a distributed computing network, such as one having any number of clients and/or servers. Referring now to FIG. 27, there is shown a block diagram depicting an exemplary architecture 30 for implementing at least a portion of a system according to one aspect on a distributed computing network. According to the aspect, any number of clients 33 may be provided. Each client 33 may run software for implementing client-side portions of a system; clients may comprise a system 20 such as that illustrated in FIG. 26. In addition, any number of servers 32 may be provided for handling requests received from one or more clients 33. Clients 33 and servers 32 may communicate with one another via one or more electronic networks 31, which may be in various aspects any of the Internet, a wide area network, a mobile telephony network (such as CDMA or GSM cellular networks), a wireless network (such as WiFi, WiMAX, LTE, and so forth), or a local area network (or indeed any network topology known in the art; the aspect does not prefer any one network topology over any other). Networks 31 may be implemented using any known network protocols, including for example wired and/or wireless protocols.

In addition, in some aspects, servers 32 may call external services 37 when needed to obtain additional information, or to refer to additional data concerning a particular call. Communications with external services 37 may take place, for example, via one or more networks 31. In various aspects, external services 37 may comprise web-enabled services or functionality related to or installed on the hardware device itself. For example, in one aspect where client applications 24 are implemented on a smartphone or other electronic device, client applications 24 may obtain information stored in a server system 32 in the cloud or on an external service 37 deployed on one or more of a particular enterprise's or user's premises. In addition to local storage on servers 32, remote storage 38 may be accessible through the network(s) 31.

In some aspects, clients 33 or servers 32 (or both) may make use of one or more specialized services or appliances that may be deployed locally or remotely across one or more networks 31. For example, one or more databases 34 in either local or remote storage 38 may be used or referred to by one or more aspects. It should be understood by one having ordinary skill in the art that databases in storage 34 may be arranged in a wide variety of architectures and using a wide variety of data access and manipulation means. For example, in various aspects one or more databases in storage 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some aspects, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, some aspects may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with aspects without limitation, unless a specific security 36 or configuration system 35 or approach is specifically required by the description of any specific aspect.

Figure 28:
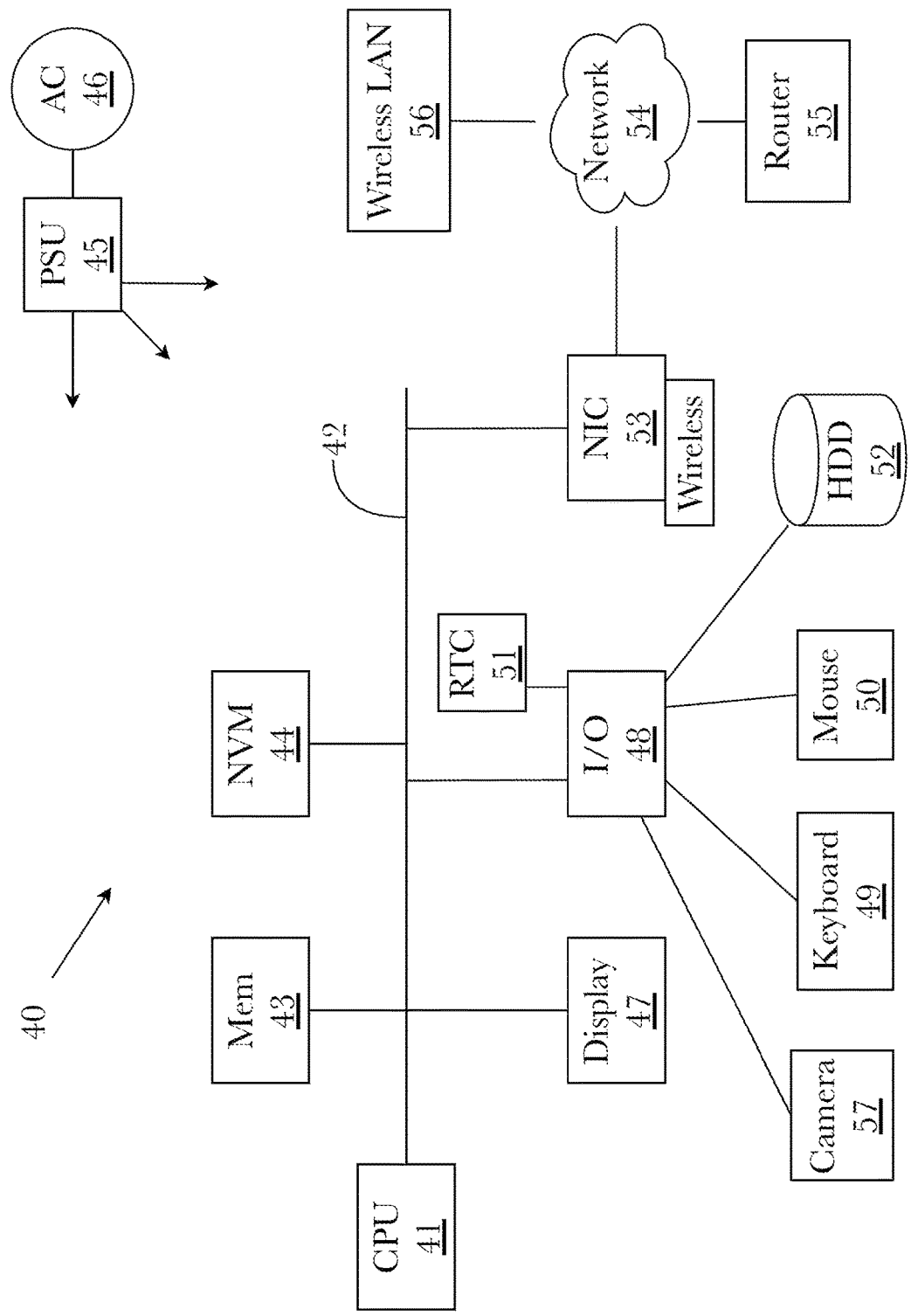
FIG. 28 is another block diagram illustrating an exemplary hardware architecture of a computing device.

FIG. 28 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to peripherals such as a keyboard 49, pointing device 50, hard disk 52, real-time clock 51, a camera 57, and other peripheral devices. NIC 53 connects to network 54, which may be the Internet or a local network, which local network may or may not have connections to the Internet. The system may be connected to other computing devices through the network via a router 55, wireless local area network 56, or any other network connection. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various aspects, functionality for implementing systems or methods of various aspects may be distributed among any number of client and/or server components. For example, various software modules may be implemented for performing various functions in connection with the system of any particular aspect, and such modules may be variously implemented to run on server and/or client components.

The skilled person will be aware of a range of possible modifications of the various aspects described above. Accordingly, the present invention is defined by the claims and their equivalents.

What is claimed is:

1. A system for user, device, and transaction authentication utilizing smart contracts, comprising:
an authentication manager comprising at least a processor, a memory, and a first plurality of programming instructions stored in the memory and operating on the processor, wherein the first plurality of programming instructions, when operating on the processor, cause the processor to:
receive a smart callback contract, the smart callback contract comprising default data fields, wherein the default data fields are populated with information from at least historical user identifier and behavior data and a scheduled callback time; and
prior to the scheduled callback time:
obtain current user identifiers and behavior data from a user communication device;
provide user and device authentication by comparing the current identifiers and behavior against the historical user identifier and behavior data stored within the smart callback contract to identify one or more matches between the two sets of information; and
authorize the authenticated user or device to access the smart callback contract.

2. The system of claim 1, wherein the smart callback contract is stored on a blockchain ledger.

3. The system of claim 1, wherein the default data fields are further populated with information from at least user profiles, agent and brand data, environmental context and user intent, and estimated wait times.

4. The system of claim 1, further comprising a callback manager comprising at least a processor, a memory, and a second plurality of programming instructions stored in the memory and operating on the processor, wherein the second programming instructions, when operating on the processor, cause the processor to:
store and maintain global user profiles;
store and maintain a blockchain ledger;
communicate with a brand interface server;
maintain relevant agent and brand data from a brand interface server;
execute callback requests;
determine environmental context and user intent;
calculate estimated wait times for callbacks;
receive a callback request and a scheduled callback time from the brand interface server;
create the smart callback contract, the smart callback contract comprising default data fields, wherein the default data fields are populated with information from at least historical user identifier and behavior data and a scheduled callback time; and
send the smart contract to the authentication module.

5. The system of claim 4, wherein the callback manager is further configured to:
receive user authorization to access the smart contract from the authentication module; and
upon receiving user authorization:
execute the smart callback contract between consumers and agents at a specified time;
connect the two parties, when the two first and second called parties are online; and
validate the smart callback contract and add the callback to the blockchain ledger.

6. The system of claim 4, further comprising a brand interface server comprising at least a processor, a memory, and a third plurality of programming instructions stored in the memory and operating on the processor, wherein the third programming instructions, when operating on the processor, cause the processor to:
communicate with the callback manager;
send data related to the smart callback contract and agents to the callback manager;
receive user calls to a brand;
create a callback request upon the user requesting a call back from a brand;
schedule a callback time with user based on user availability and agent scheduling; and forward the callback request and the scheduled callback time to the callback manager.

7. The system of claim 1, wherein the user identifier and behavior data comprises at least one or more of a preferred user hand of the user, a number of fingers used by the user in typing, an average key pressure, a location, a language setting, a WiFi access point, an install date of an authentication application, an install date of one or more applications, an application usage parameter, a cadence between keystrokes, an amount of spelling errors, types of emoji used, an average number of emojis used, a swipe text usage, local region settings, a sim card identifier, a user location pattern, web site interaction time, a device angle, a device height from the ground, a user communication device identification number, a connection to a smart wearable, a time period of movement of the user communication device, and user biometric data.

8. The system of claim 1, wherein the historical user identifier and behavior data is stored on a blockchain.

9. The system of claim 8, wherein the historical user identifier and behavior data is stored as a hash value on the blockchain.

10. The system of claim 1, wherein the user communication device comprises at least a processor, a memory, a plurality of sensors, and a software application comprising a plurality of programming instructions stored in the memory and operating on the processor of the user communication device, which causes the user communication device to:
    monitor and collect device usage characteristic data to determine the current user identifiers and behavior data based on software application usage data and sensor data; and
    send the current user identifiers and behavior data to the authentication manager.

11. A method for user, device, and transaction authentication utilizing smart contracts, comprising the steps of:
    receiving a smart callback contract, the smart callback contract comprising default data fields, wherein the default data fields are populated with information from at least historical user identifier and behavior data and a scheduled callback time; and
    prior to the scheduled callback time:
        obtaining current user identifiers and behavior data from a user communication device;
        providing user and device authentication by comparing the current identifiers and behavior against the historical user identifier and behavior data stored within the smart callback contract to identify one or more matches between the two sets of information; and
        authorizing the authenticated user or device to access the smart callback contract.

12. The method of claim 11, wherein the smart callback contract is stored on a blockchain ledger.

13. The method of claim 11, wherein the default data fields are further populated with information from at least user profiles, agent and brand data, environmental context and user intent, and estimated wait times.

14. The method of claim 11, further comprising the steps of:
    storing and maintaining global user profiles;
    storing and maintaining a blockchain ledger;
    communicating with a brand interface server;
    maintaining relevant agent and brand data from a brand interface server;
    executing callback requests;
    determining environmental context and user intent;
    calculating estimated wait times for callbacks;
    receiving a callback request and a scheduled callback time from the brand interface server;
    creating the smart callback contract, the smart callback contract comprising default data fields, wherein the default data fields are populated with information from at least historical user identifier and behavior data and a scheduled callback time; and
    sending the smart contract to the authentication module.

15. The method of claim 14, further comprising the steps:
    receiving user authorization to access the smart contract from the authentication module; and
    upon receiving user authorization:
        executing the smart callback contract between consumers and agents at a specified time;
        connecting the two parties, when the two first and second called parties are online; and
        validating the smart callback contract and add the callback to the blockchain ledger.

16. The method of claim 14, further comprising the steps of:
    communicating with the callback manager;
    sending data related to the smart callback contract and agents to the callback manager;
    receiving user calls to a brand;
    creating a callback request upon the user requesting a call back from a brand;
    scheduling a callback time with user based on user availability and agent scheduling; and
    forwarding the callback request and the scheduled callback time to the callback manager.

17. The method of claim 11, wherein the user identifier and behavior data comprises at least one or more of a preferred user hand of the user, a number of fingers used by the user in typing, an average key pressure, a location, a language setting, a WiFi access point, an install date of an authentication application, an install date of one or more applications, an application usage parameter, a cadence between keystrokes, an amount of spelling errors, types of emoji used, an average number of emojis used, a swipe text usage, local region settings, a sim card identifier, a user location pattern, web site interaction time, a device angle, a device height from the ground, a user communication device identification number, a connection to a smart wearable, a time period of movement of the user communication device, and user biometric data.

18. The method of claim 11, wherein the historical user identifier and behavior data is stored on a blockchain.

19. The method of claim 18, wherein the historical user identifier and behavior data is stored as a hash value on the blockchain.

20. The method of claim 1, further comprising the steps of:
    monitoring and collecting device usage characteristic data to determine the current user identifiers and behavior data based on software application usage data and sensor data; and
    sending the current user identifiers and behavior data to the authentication manager.

* * * * *